United States Patent
Thomas et al.

(10) Patent No.: US 7,043,094 B2
(45) Date of Patent: May 9, 2006

(54) PROCESS FOR THE AUTOMATIC CREATION OF A DATABASE OF IMAGES ACCESSIBLE BY SEMANTIC FEATURES

(75) Inventors: Corinne Thomas, Chaumont (FR); Hassane Essafi, Orsay (FR)

(73) Assignee: Commissariat a l'Energie Atomique, Paris (FR)

( * ) Notice: Subject to any disclaimer, the term of this patent is extended or adjusted under 35 U.S.C. 154(b) by 702 days.

(21) Appl. No.: 10/165,199

(22) Filed: Jun. 7, 2002

(65) Prior Publication Data

US 2003/0113017 A1 Jun. 19, 2003

(30) Foreign Application Priority Data

Jun. 7, 2001 (FR) .................................. 01 07481

(51) Int. Cl.
*G06K 9/54* (2006.01)

(52) U.S. Cl. ...................... 382/305; 382/282; 382/164; 707/1

(58) Field of Classification Search ................ 382/305, 382/282, 164
See application file for complete search history.

(56) References Cited

U.S. PATENT DOCUMENTS

| | | | | |
|---|---|---|---|---|
| 5,579,471 A | * | 11/1996 | Barber et al. ................ | 715/700 |
| 5,708,822 A | * | 1/1998 | Wical ............................ | 704/1 |
| 5,751,286 A | * | 5/1998 | Barber et al. ................ | 715/835 |
| 5,802,361 A | * | 9/1998 | Wang et al. ................. | 382/217 |
| 5,825,917 A | * | 10/1998 | Suzuki ......................... | 382/164 |
| 5,893,095 A | * | 4/1999 | Jain et al. ...................... | 707/6 |
| 5,911,139 A | * | 6/1999 | Jain et al. ...................... | 707/3 |
| 5,913,205 A | * | 6/1999 | Jain et al. ...................... | 707/2 |
| 5,915,250 A | * | 6/1999 | Jain et al. .................... | 707/100 |
| 5,918,240 A | * | 6/1999 | Kupiec et al. .............. | 715/531 |
| 5,920,856 A | * | 7/1999 | Syeda-Mahmood ............ | 707/3 |
| 5,930,783 A | * | 7/1999 | Li et al. ......................... | 707/1 |
| 5,983,218 A | * | 11/1999 | Syeda-Mahmood ............ | 707/3 |
| 5,987,456 A | * | 11/1999 | Ravela et al. .................. | 707/5 |
| 5,987,459 A | * | 11/1999 | Swanson et al. ............... | 707/6 |
| 5,999,664 A | * | 12/1999 | Mahoney et al. ........... | 382/305 |
| 6,038,560 A | * | 3/2000 | Wical ............................ | 707/5 |

(Continued)

OTHER PUBLICATIONS

Belongie, S., Carson, C., Greenspan, H., Malik, J., "Color- and Texture-Based Image Segmentation Using EM and Its Application to Content-Based Image Retrival", 1998, Computer Vision, 1998. Sixth International Conference on, ISBN: 81-7319-221-9.*

(Continued)

*Primary Examiner*—Kanjibhai Patel
*Assistant Examiner*—Sath V. Perungavoor
(74) *Attorney, Agent, or Firm*—Weingarten, Schurgin, Gagnebin & Lebovici LLP

(57) ABSTRACT

An initial image is subjected to a plurality of segmentations into uniform components by using various criteria to identify and isolate several series of objects constituted by segmented thumbnail images associated with geometrical descriptors for boxes that cover said objects, the results of the segmentation methods are fused, numerical values are used to characterize each object thumbnail image that results from fusion, and each of the thumbnail images is compared with indexed thumbnail images in an indexed database containing a set of textual descriptions for everyday elementary objects. The list of textual descriptions of everyday elementary objects matching the object thumbnail images that result from the segmentation and fusion operations is provided together with pertinence levels.

17 Claims, 13 Drawing Sheets

U.S. PATENT DOCUMENTS

| | | | |
|---|---|---|---|
| 6,175,829 B1* | 1/2001 | Li et al. | 707/3 |
| 6,181,838 B1* | 1/2001 | Knowlton | 382/305 |
| 6,182,069 B1* | 1/2001 | Niblack et al. | 707/6 |
| 6,502,105 B1* | 12/2002 | Yan et al. | 707/104.1 |
| 6,510,243 B1* | 1/2003 | Ikeda | 382/173 |
| 6,535,639 B1* | 3/2003 | Uchihachi et al. | 382/225 |
| 6,668,078 B1* | 12/2003 | Bolle et al. | 382/164 |
| 6,718,063 B1* | 4/2004 | Lennon et al. | 382/224 |
| 6,785,418 B1* | 8/2004 | Barton et al. | 382/186 |
| 6,819,797 B1* | 11/2004 | Smith et al. | 382/181 |
| 6,853,746 B1* | 2/2005 | Shin et al. | 382/164 |
| 6,859,554 B1* | 2/2005 | Porikli et al. | 382/173 |
| 6,882,746 B1* | 4/2005 | Naveen et al. | 382/173 |
| 6,937,761 B1* | 8/2005 | Thomas et al. | 382/173 |
| 2002/0076100 A1* | 6/2002 | Luo | 382/164 |
| 2002/0090133 A1* | 7/2002 | Kim et al. | 382/164 |
| 2002/0102017 A1* | 8/2002 | Kim et al. | 382/164 |
| 2003/0053685 A1* | 3/2003 | Lestideau | 382/164 |
| 2004/0013305 A1* | 1/2004 | Brandt et al. | 382/224 |

OTHER PUBLICATIONS

Smith, J.R., Chang, S.F., "Visually Searching the Web for Content", 1997, IEEE Multimedia, 4(3): Jul. 12-20, 1997.*

Smith, J.R., "Integrated Spatial and Feature Image Systems: Retrieval, Analysis and Compression", PhD Thesis Graduate School of Arts and Sciences, Columbia University, 1997.*

Thirion, B., Bascle, B., Ramesh, V., Navab, N., "Fusion of Color, Shading and Boundary Information for Factory Pipe Segmentation", 2000, Computer Vision and Pattern Recognition, 2000. Proceedings. IEEE Conference on, 2000.*

Aslandogan, Y.A., Thier, C., Yu, C.T., Zou, J., Rishe, N., "Using Sematic Contents and WordNet in Image Retrival", 1997, Proceeding of the 20th Annual International ACM SIGIR, 1997, ISBN: 0-89791-836-3.*

Miller, G.A., "WordNet:a lexical database for English", 1995, Communication of the ACM, ISSN: 0001-0782, 1995.*

Smith, J. R., Chang, S.F., "VisualSEEk: a Fully Automated Content-Based Image Query System", In ACM Multimedia, Boston, MA, Nov. 1996.*

Smith, J. R., Chang, S.F., "An Image and Video Search Engine for the World-Wide Web", In IS&T/SPIE Symposium on Electronic Imaging: Science and Technology (EI'97)—Storage and Retrieval for Image and Video Databases V. San Jose, CA, Feb. 1997.*

Smith, J.R., Chang, S.F., "Local Color and Texture Extraction and Spatial Query", Image Processing, 1996. Proceedings., International Conference on, INSPEC Accession No.: 5595529.*

Smeulders, A.W.M., Worring, M., Santini, S., Gupta, A., Jain, R., "Content-Based Image Retrieval at the End of the Early Years", 2000, Pattern Analysis and Machine Intelligence, IEEE Transactions on , ISSN: 0162-8828.*

Gong, Y., Zhang,H., Chuan, H.C., Sakauchi, M., "An Image Database System with Content Capturing and Fast Image Indexing Abilities", 1994, Multimedia Computing and Systems, 1994., Proceedings of the International Conference on, ISBN: 0-8186-5530-5.*

Hee, M., Yong-Ik, Y., Kim, K.C., "Intelligent Hybrid Video Retrieval System Supporting Spatio-Temporal Correlation, Similarity Retrieval", Systems, Man, and Cybernetics, 1999. IEEE SMC '99 Conference Proceedings., INSPEC Accession No. :6521335.*

A. R. Rao, et al., "The Relationship Between Texture Terms and Texture Images: A Study in Human Texture Perception", Storage and Retrieval for Still Image and Video Databases 4, San Jose, Feb. 1-2, 1996, Proceedings of SPIE, Bellingham, SPIE, US, vol. 2670, Feb. 1, 1996, pp. 206-214, XP000642571, ISBN: 0-8194-2044-1.

* cited by examiner

PROCESS FOR THE AUTOMATIC CREATION OF A DATABASE OF IMAGES ACCESSIBLE BY SEMANTIC FEATURES

FIELD AND BACKGROUND OF THE INVENTION

The present invention relates to a method of automatically creating an image database that can be interrogated by its semantic content, the database being created from initial images that are not indexed.

The invention also relates to a method of indexing and searching images by means of their semantic content.

The object of the invention is to make it possible to interrogate image bases by content, in a manner that is ergonomic and intuitive for the user.

A first possible solution for interrogating an image base might consist in reusing the techniques devised for searching text information, using images that have previously been annotated manually. That would consist in formulating a textual query in order to obtain in return a set of images whose textual descriptions (the fruit of prior indexing) match the query more or less well. Such an approach would indeed give access to the semantic content of images, but unfortunately it implies indexing being performed manually. That type of procedure is thus relatively lengthy, tedious, and inconceivable in the presence of a large number of images. Furthermore, that style of indexing would be effective in use only for bases where the indexers and the users possess the same level of expertise. Furthermore, given the time necessary for generating the catalog of the images, it is illusory to imagine that the images could be described with sufficient accuracy or objectivity, particularly since the target of a future search is not necessarily known during the indexing process. Important elements in the image might then be ignored. Furthermore, an element such as a building, a vehicle, or a character when described in terms of the category of which that element forms a part, would be identified only after visually examining the image.

Another possible solution might consist in reusing the work of computer vision researchers using image analysis, processing, coding, and compression. To do this, it is necessary to use systems capable of responding to the visual properties of images (texture, shape, color). That type of approach would indeed enable automatic indexing to be performed in objective manner and without a priori knowledge. However that approach would come up against the semantic barrier since two images can be perceptibly similar without that making them cognitively similar, and similarly two images that are cognitively similar can be utterly different perceptually.

With that style of approach known as "search by example", there already exist various products that accept as a question a sample that resembles the image sought by the user. Various solutions have thus been proposed:

a first solution consists in looking for an object by describing its outline or its texture. However to enable that type of approach to work, it is necessary to analyze the images digitally and to extract the corresponding information from them. Unfortunately, there does not exist any method of extracting the contour or the texture of an object which is effective under all circumstances, and furthermore, those methods fail when objects are masked in part, are in the shade, or when the sample and the images in the database are subject to different kinds of lighting; and a second possible approach consists in comparing the sample with various portions of the images; a comparison is positive when the points of an image fragment have the same hue as the points of the sample. In addition to the lengthy computation time due to the number of operations needed, the sample image must be taken under conditions that are similar to those which applied when the images in the database were taken (lighting, distance, orientation), which limits the impact of that type of approach.

Another drawback results from the fact that the user must possess a sample that is representative of the image being sought. Unfortunately, there exist numerous circumstances when the user does not possesses such a sample, the user merely having an idea of what to look for.

BRIEF SUMMARY OF THE INVENTION

The invention thus seeks to create synergy between textual and perceptual descriptions in order to provide greater flexibility when interrogating a database and in order to increase the relevance of the replies while simultaneously reducing computation time.

According to the invention, these objects are achieved by a method of taking initial images that are not indexed and automatically creating therefrom a database of images that can be interrogated by semantic content, the method being characterized in that it comprises the following steps:

a) constructing a first indexed database constituting a thematic information dictionary containing thematic information likely to appear in a set of different images;

b) constructing a second indexed database constituting a vade-mecum bringing together a set of textual descriptions of ordinary elementary objects in the form of thumbnail images that are indexed both textually and pictorially;

c) analyzing each initial image overall to identify and list various zones in the image coarsely;

d) comparing each initial image as subjected to overall analysis with images that have previously been indexed in the image database to be built up;

e) classifying an initial image that has been analyzed overall in the image database if the result of the comparison with the previously indexed images reveals a degree of similarity that is greater than a predetermined threshold;

f) analyzing each initial image in local manner if the result of the comparison between the initial image as analyzed overall and the previously indexed images reveals a degree of similarity that is below a predetermined threshold;

g) during local analysis of an initial image, proceeding with a plurality of segmentations of said image into uniform components by using a plurality of different criteria for identifying and isolating a plurality of series (Ai, Bi, Ci, . . . ) of objects constituted by segmented thumbnail images associated with geometrical descriptors for boxes covering said objects (Ai, Bi, Ci, . . . );

h) after the step which consists in proceeding with a plurality of segmentations, fusing the results of the segmentation methods;

i) using digital values to characterize each of the object thumbnail images that result from fusion after the segmentation and fusion operations and associated with geometrical descriptors for boxes covering the various objects;

j) comparing each of the object thumbnail images that result from the segmentation and fusion operations with the indexed thumbnail images of the indexed second database and providing together with respective pertinence levels a list of textual descriptions of everyday elementary objects matching said object thumbnail images resulting from the segmentation and fusion operations;

k) for each object thumbnail image resulting from the segmentation and fusion operations, characterizing its color in textual manner by matching terms from a chromatic dictionary with the histogram of each object converted into a color space;

l) for each object thumbnail image resulting from the segmentation and fusion operations, textually characterizing its texture by matching the characteristic vector of the object with those of a dictionary of indexed textures;

m) determining the geometrical aspects of the objects relative to one another, and characterizing in textual manner the spatial relationship and/or the shapes of the various objects; and n) after analyzing the various components of the initial image via said object thumbnail images that result from the segmentation and fusion operations associated with textual descriptions of everyday elementary objects, putting said data into the image base that is to be built up.

After step m) of determining the geometrical locations of the objects relative to one another and of textually characterizing the spatial relationships between the various objects, a step o) is performed of establishing whether an initial image belongs to a theme on the basis of dependency relationships between the various objects and a comparison with the thematic information dictionary.

After step m) of determining the geometrical locations of the objects relative to one another and of textually characterizing the spatial relationships of the various objects, a step p) is performed in which the textual information for an entire indexed image is brought together in association with the vade-mecum.

According to a particular characteristic, during step e) of classification in the image database, special features of the initial image under analysis are characterized relative to each of the most similar previously-indexed images.

In an advantageous embodiment, step h) of fusing the results of the representation methods consists in ordering the set of objects (Ai, Bi, Ci, . . . ) that results from the segmentation in order of decreasing area so as to obtain a list, and then so long as there remain unvisited objects in the list, in taking the first free element of the list, in checking to see whether said elements overlap any of the following elements in the list that are free, and if there is an overlap between objects derived from different segmentation methods, in constructing a first graph (Gi) and in marking said elements as being not free, so as to obtain a series of first graphs (Gi), in performing the same operations again using the same objects (Ai, Bi, Ci, . . . ) that result from segmentations ordered in order of increasing area, so as to obtain a series of second graphs (G'i), and in combining the first and second graphs (Gi, G'i) so as to fuse the results of the segmentation methods.

In a particular implementation, during step g) of segmenting locally analyzed images into uniform components, by using a plurality of different criteria, the following are performed:

(i) texture characteristics are detected by filtering equivalent to a bank of highpass and lowpass filters;

(ii) chromatic and achromatic detection are performed; and (iii) outlines are detected.

In a possible particular implementation, during segmentation step g), the detection of texture characteristics via filtering equivalent to a bank of highpass filters and lowpass filters comprises a wavelet transformation process performed firstly on rows and then on columns of the image with on each occasion a lowpass filter characterized by the formula:

$$y(i)=0.5*x(i)+0.5y(i-1)$$

and a highpass filter characterized by the formula:

$$y(i)=0.5*x(i)-0.5y(i-1)$$

each element (i,j) of the 3D attribute matrix that results from the splitting being a vector characterizing the distribution of pixel values in the vicinity of the point (i,j).

When the image to be processed is large in size and presents high resolution, after each operation of filtering by means of a highpass filter and a lowpass filter, the number of images obtained is divided by $2^n$ so as to reduce the amount of data to be processed, the integer n increasing with increasing resolution and size of the image to be processed.

Advantageously, the wavelet transformation process is reiterated several times over n stages, and after a smoothing stage, the size of the resulting 3D attribute matrix is reduced in depth by retaining only the [2n+(n−1)] images that contain the most detail.

Furthermore, a process may also be performed of seeking the distribution of the attribute matrix that is best in the sense of maximizing energy.

In one particular possible implementation, during segmentation step g), chromatic and achromatic detection comprises a step of converting the image to the hue saturation value (HSV) model, an achromatic propagation step to eliminate the background, an opening step performed during a first iteration to eliminate noise and reconnect regions, and in the event of non-convergence at the end of this first iteration, a closure step performed during a second iteration.

In another particular possible implementation, during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

BRIEF DESCRIPTION OF THE DRAWING

Other characteristics and advantages of the invention appear from the following detailed description of particular implementations given as examples and with reference to the accompanying drawings, in which.

The invention relates to a method enabling a knowledge base of images to be created automatically and subsequently consulted. A base of indexed images associated with a concept dictionary is generated on the basis of initial image documents.

DETAILED DESCRIPTION OF THE INVENTION

For each image of the base, the method of the invention comprises analyzing the image to be indexed, identifying the objects of the image, and describing the relationships between the objects both spatially and semantically in order to obtain an indexed image.

The method thus automatically generates text describing the image, which text describes without omission everything that appears in the image and creates links between objects in order to propose a context or a theme.

The method is applicable to a set of input images that can be of origins that are highly varied and non-uniform, both in terms of presentation and in terms of the subjects concerned.

It is essential to characterize the pictorial aspect of an image for indexing, and all of the information necessary for describing the image must be extracted.

This information is then integrated to produce a so-called "signature" of the image which is a faithful representation of its content. The computed signature makes it possible subsequently to describe, to characterize, to segment, and to analyze each image in question. Depending on circumstances, analysis can be global or local, where the notion of local analysis becomes particularly important for an image that is complex. With complex images, a scene is initially cut up into pieces in order to recognize each of its parts, and then these parts are reassembled while attempting to show up the links that exists between each of said objects in order to reveal the main idea.

Figure 1:
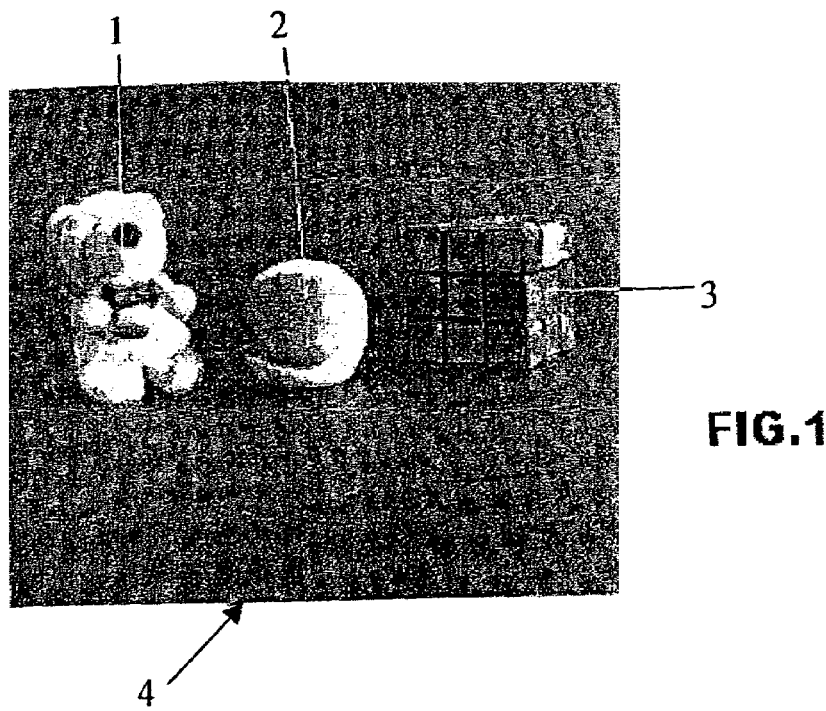
FIG. 1 is a demonstration image to which the method of the invention can be applied.

In the description below, FIG. 1 is taken essentially as a demonstration image, said figure comprising from left to right: a teddy bear 1, a ball 2, and a cube 3.

The method of the invention makes it possible to construct a knowledge base 10 comprising a first element 11 constituted by a theme dictionary (Dithem), a second element 12 constituted by a vade-mecum, i.e. a dictionary containing thumbnail images of ordinary individual objects together with their contexts, and a third element 13 constituted by an image base comprising a set of more or less complex images that have already been indexed.

Figure 2:
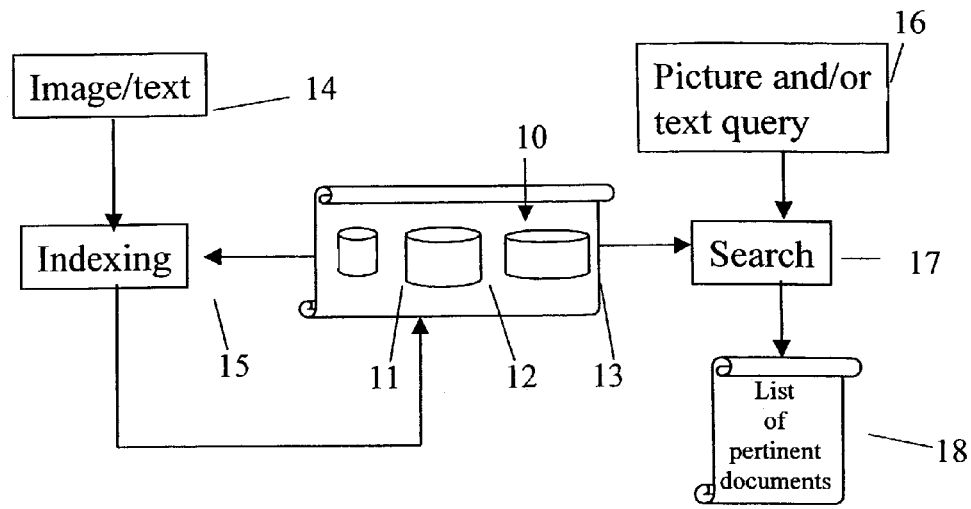
FIG. 2 is a block diagram showing how a knowledge base is used with indexed images implemented in accordance with the method of the invention.

Once it has been constituted, the knowledge base 10 makes it possible to respond to a pictorial and/or textual question (module 16 of FIG. 2) by performing a search 17 to provide a list 18 of pertinent documents taken from the knowledge base. An image and a text present in the module 14 can also, in an indexing step 15, be integrated in the knowledge base 10 and be correlated with the content thereof.

The structure of the various modules of the knowledge base is described below.

Figure 3:
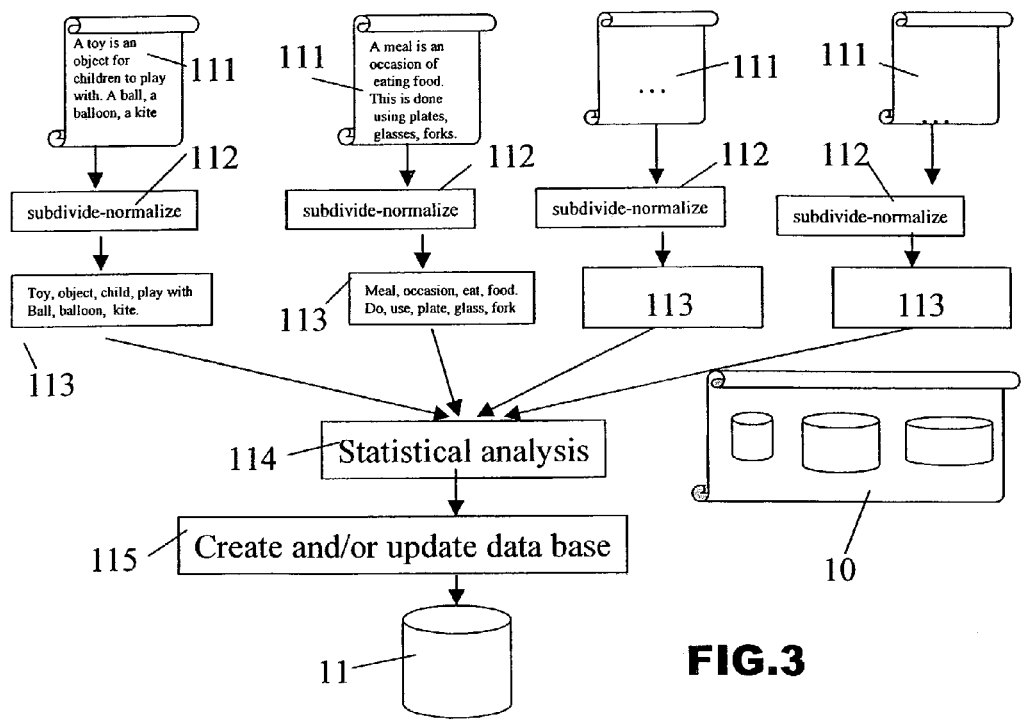
FIG. 3 is a diagram showing how a theme dictionary is built up for incorporation in the knowledge base of FIG. 2.

FIG. 3 shows the main steps in generating a theme dictionary 11 which is used subsequently for extracting the main idea or theme conveyed by an image.

To construct a theme dictionary 11, a textual database is indexed using texts 111 that explain the various components of themes.

For example the words "plate", "fork", "knife" are all parts of the theme "meal".

The initial general texts 111 enumerating the various components of a theme are subjected in a step 112 to subdivision and to normalization giving rise to lists 113 of words which are subsequently subjected to statistical analysis in step 114. After calling on the statistical analysis of step 114, the method moves onto a step 115 of creating or updating the base 11 which constitutes an encyclopedia containing the themes constituting the images.

By way of example, the subdivision and normalization procedure 112 can be performed as follows:

The base text 111 is subdivided into known units: paragraphs, sentences, and words, and subsequently words are sometimes lumped together as sayings. To do this, the text is subdivided into words by identifying word-separator characters. Thus, punctuation symbols can be considered as separators even though there are exceptions. For example, in French, the apostrophe is a priori a word separator, but for practical purposes the word "aujourd'hui" [today] constitutes an exception to this rule; space behaves in the same way as apostrophe, as for example in "compte rendu" [report]. Conversely, a hyphen is a priori not a separator, but there are exceptions, for example, questions in French "pleut-il?" [is it raining?].

After which, use is made of a general dictionary of the French language, in the present case. Searching in this dictionary is intended to find compound words. Thus, if subdivision has given: "porte" "–" "monnaie", then searching the dictionary will give "porte-monnaie" [purse]. In addition, the dictionary also makes it possible to attach grammatical categories to simple and compound words.

Sayings are then reconstructed. During this step, expressions which have been split up by the stage of subdividing into words are lumped together. For example, "au fur et à mesure" [in proportion, as, progressively] is considered as being a saying. It is the word "fur", the word in the expression that is most rarely used on its own, that generally triggers the search for sayings.

Syntactical analysis is then performed in order to determine the grammatical categories of each word so as to be better able to reduce them to their standard forms (for example the infinitive for verbs, masculine singular for adjectives, singular and sometimes masculine for nouns). It is also at this point that a search is made for syntactical relationships that exist between the various words in a sentence in order to be able to look for identical relationships between the words of a question and the words of a text.

Dependency analysis is then performed which consists in identifying all of the lexical semantic relationships (LSRs), i.e. the syntagmatic relationships (grammatical relationships uniting words in a text) and the paradigmatic relationships, i.e. the relationships between words ignoring context (for example synonyms). For example:
noun with leading adjective: "un petit garcon";
noun with following adjective: "le code civil";
noun with noun: "le livre d'histoires", "le président X";
verb-agent: "la décision est prise par le ministre";
verb-object: "toute personne peut consulter les pièces";
verb-adverb: " . . . sont équipées de manière à fermer hermétiquement";
adjective-adverb: " . . . férocement violent . . . "; and
adjective-complement of adjective: "vert bouteille", "attentifs à la leçon".

The purpose of the statistical analysis 114 is to deduce the weights of the words used in the knowledge base. The rarer a word in the knowledge base, the greater the information value that word is considered to have. For example, in a documentary base concerning atomic energy, the term "nuclear" is not very discriminating since it is present in the majority of the documents in the base. Its information weight is therefore low.

The vade-mecum 12 is constructed by generating an encyclopedia describing the characteristics of objects that are commonplace in everyday life.

Each image or thumbnail image of an object corresponds in the vade-mecum to a textual and a pictorial description specifying the object and its environment in the form of mathematically-defined lines.

While constructing the vade-mecum 12, an image file is input that contains an ordinary individual object, such as a cup, a pencil, etc. for example, and output data is obtained concerning the object to be indexed.

This data associated with each such object can be the following, for example:
a name;
circumstances of use;
the role of the object in daily life;
the gender and the number of the object;
physical features, or more precisely the names of subspecies together with their morphological features;
adjectives that are usually used for qualifying the noun;
a description of the type suitable for use in a dictionary; and
connotations (subjective interpretation).

Figure 4:
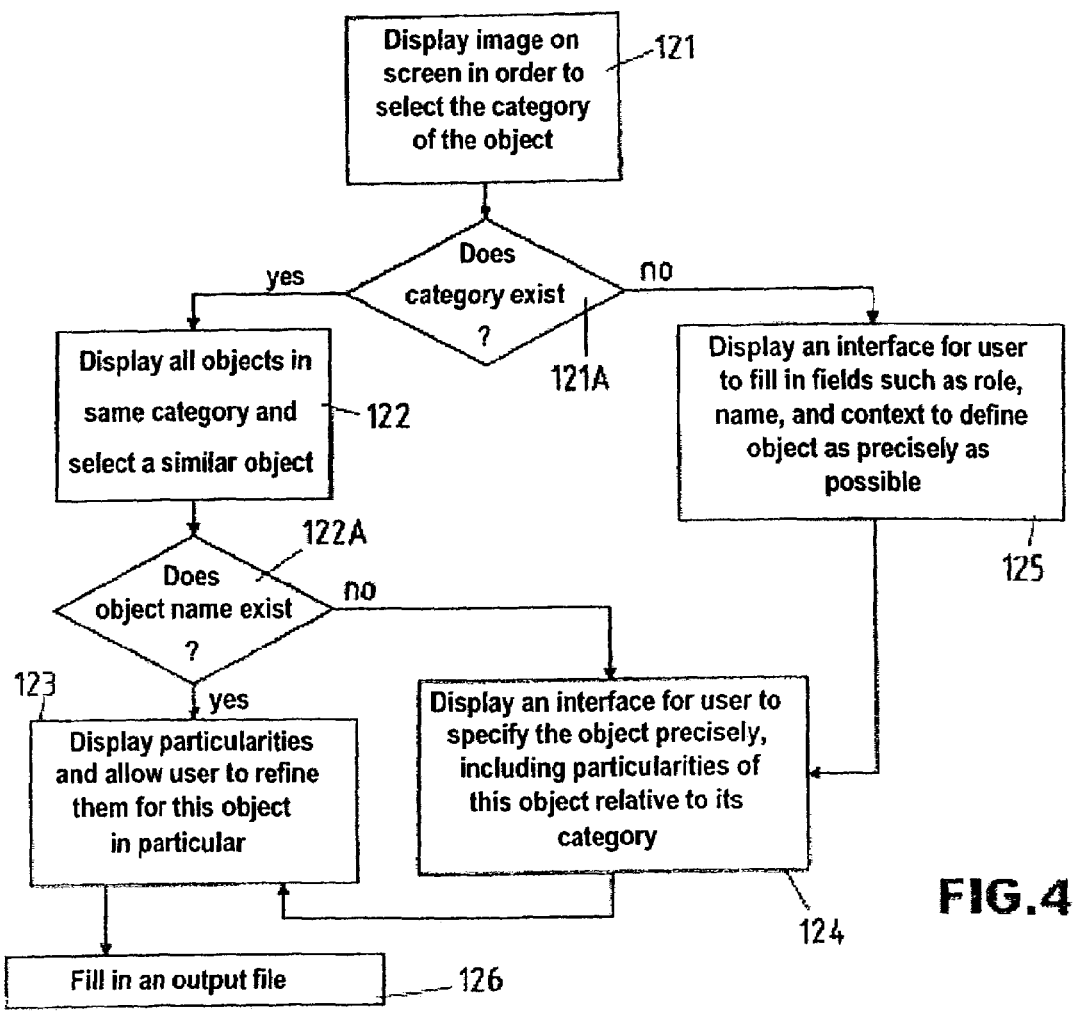
FIG. 4 is a flow chart showing an example of an algorithm for building a vade-mecum incorporated in the knowledge base of FIG. 2.

The vade-mecum 12 is used by the perception module described below to recognize the components of an image for indexing using previously defined mathematical characteristics (signatures). For example, the description of the word "pomme" [apple] can be in the following form:
Noun: Pomme
Gender: Feminine
Number: Singular
Context of use:
Role:
Notes:
Physical features:
  golden [Golden Delicious]→dessert apple, yellow skin and juicy flesh
  granny-smith [Granny Smith]→bright green apple with firm flesh and acid taste
  reinette du Canada [Reinette du Canada]→large green apple
  reinette grise [Russet]→large green apple
  reinette du Mans→a juicy apple of yellow color
  reinette des reinettes→an apple with a yellow and red skin
Adjective: green, rotten, ripe, wrinkled, dry, tasty, sleepy, luscious, juicy, pulpy
Description: fruit of the apple tree, round with firm and juicy flesh, having five hard cells containing pips
Pictorial description: pointer to the vector An example of an algorithm for constructing the vade-mecum 12 is shown in FIG. 4.

In a first step 121, an image is displayed on the screen in order to select the category of the object using a test 121A.

If test 121A finds that the category exists, then the method passes onto step 122 of displaying all of the objects in this category in order to select an object that is similar using a test 122A.

If test 122A reveals that the name for the object already exists, then the method passes onto step 123 of displaying particular information which the user can clarify and confirm for this object in particular, after which it passes onto step 126 of completing a description document which may be in the form of an output file.

If test 122A shows that the name for the object does not already exist, then the method passes onto step 124 in which an interface is displayed that enables the user to specify the object in detail, with information specific to the object relative to its category, after which the method moves onto step 123.

After step 121, if test 121A shows that the category does not exist, then the method moves onto step 125 displaying an interface enabling the user to fill in fields such as the role, the name, the context in order to define the object as accurately as possible, after which the method moves onto step 124.

The loop in FIG. 4 is repeated so long as there remain objects to be put into the vade-mecum.

The text database is then updated.

The images which have just been put into the vade-mecum 12 are indexed in pictorial manner, e.g. using the format defined in French patent application Nos. 2 753 820 and 2 779 848.

Figure 5:
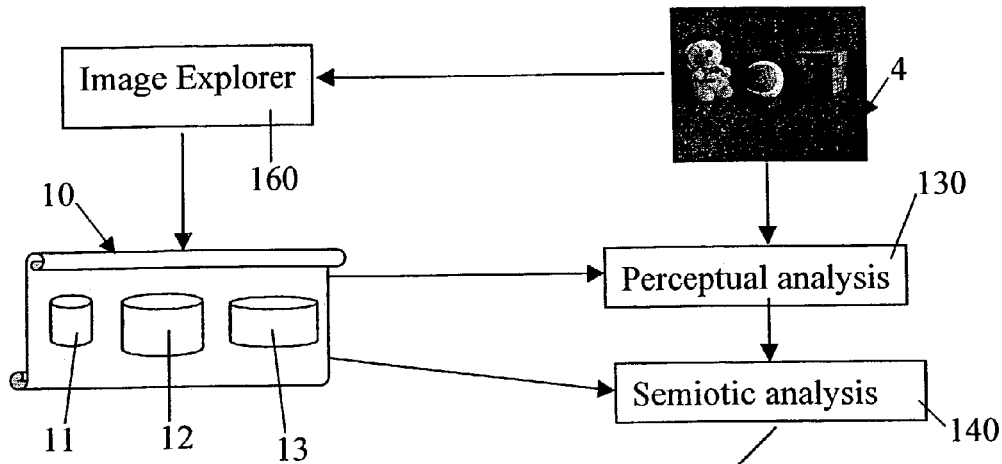
FIG. 5 is a diagram showing the general architecture of the process whereby an image for integrating in the image base of the knowledge base of FIG. 2 is indexed.

FIG. 5 shows the general architecture of the image indexing process implemented when building the image base 13 in the knowledge base 10.

Starting from a base image such as the demonstration image 4, the process of indexing an image essentially comprises perceptual analysis (module 130) for the purpose of describing the perceptual content of the image, and semiotic analysis (module 140) which together provide the information needed to perform automatic indexing without human intervention and to supply as outputs an identity card 150 having textual data that is automatically integrated in the knowledge base 10 while the pictorial data is also supplied to the knowledge base via the object recognition module 160.

Perceptual analysis 130 consists in providing a visual description of the image both from an overall point of view enabling the entire image to be described (dominant color, locations of the various objects, . . . ), and from a local point of view which makes it possible to describe each of the components of the image in precise manner.

Perceptual analysis implies implementing various methods.

Thus, a module 131 serves to segment the image into uniform components 41, 42, 43 so as to facilitate subsequent computation of characteristics.

Other modules 132, 133, 160, 137 are used to extract and characterize invariant properties of the image and of its components.

The module 132 thus serves to characterize the color(s), and the module 133 serves to characterize the texture(s) present in the image and in its components 41, 42, 43.

The module 137 serves to locate the various objects in the general image.

The module 160 serves to detect points of interest and then performs triangulation to extract a mesh on which local characteristics are computed that are robust in the face of common picture-taking transformations (in particular Zernike's transformation). The module 160 can make use in particular of the methods described in documents FR 2 753 820 and FR 2 779 848.

Figure 7:
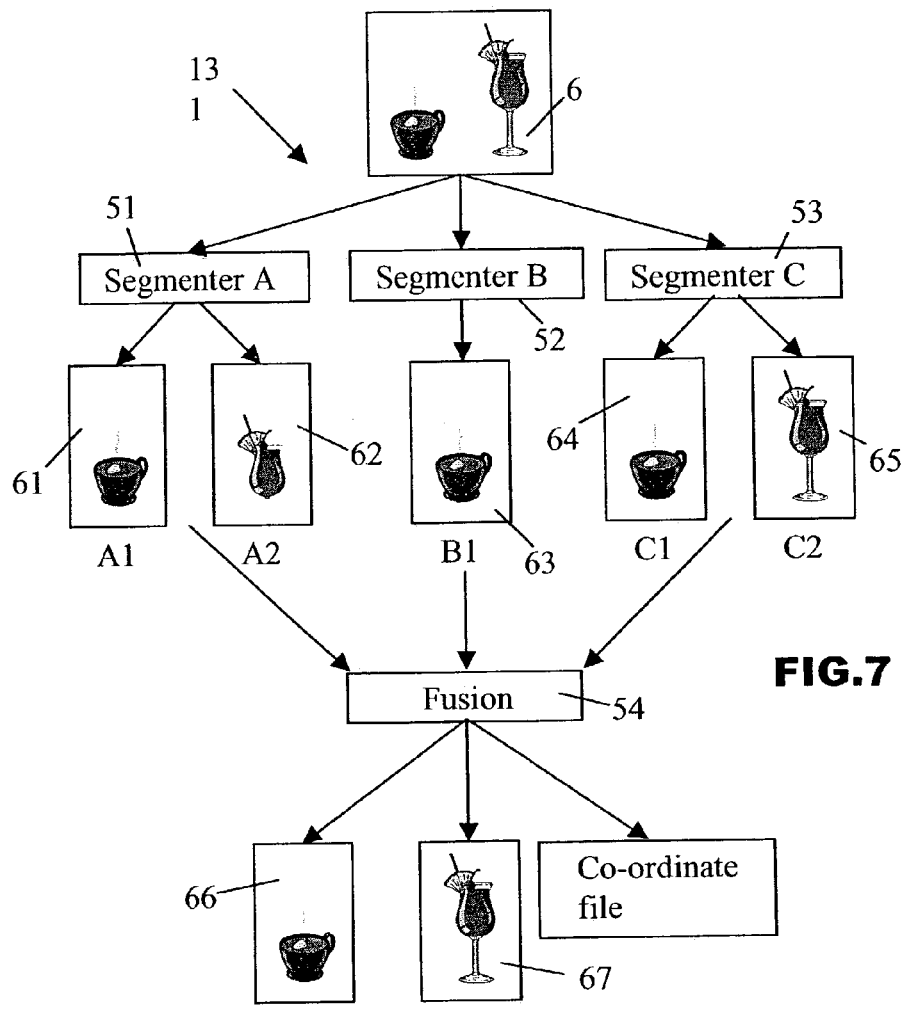
FIG. 7 is a diagram showing an example of a segmentation module forming part of the perceptual analysis shown in FIG. 6.
Figure 8:
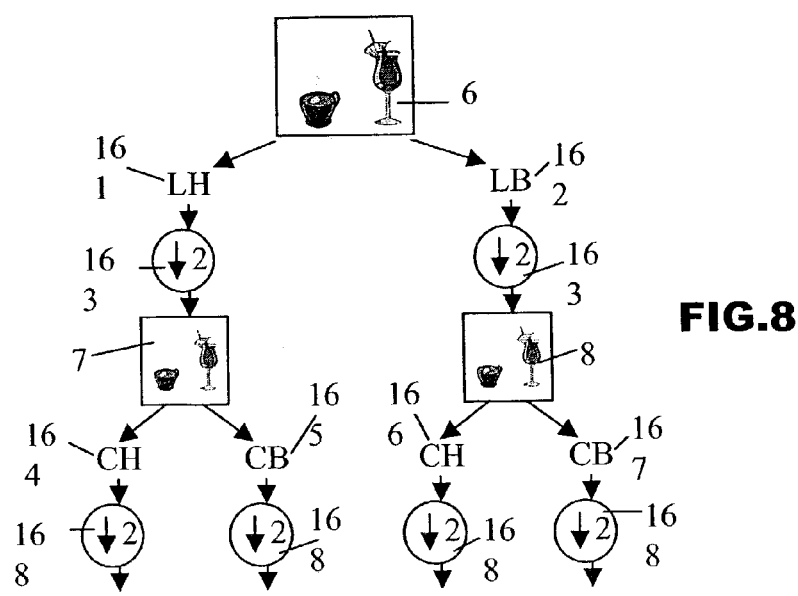
FIG. 8 is a diagram representing the wavelet transform corresponding to a first type of segmentation incorporated in the segmentation module of FIG. 7.
Figure 9:
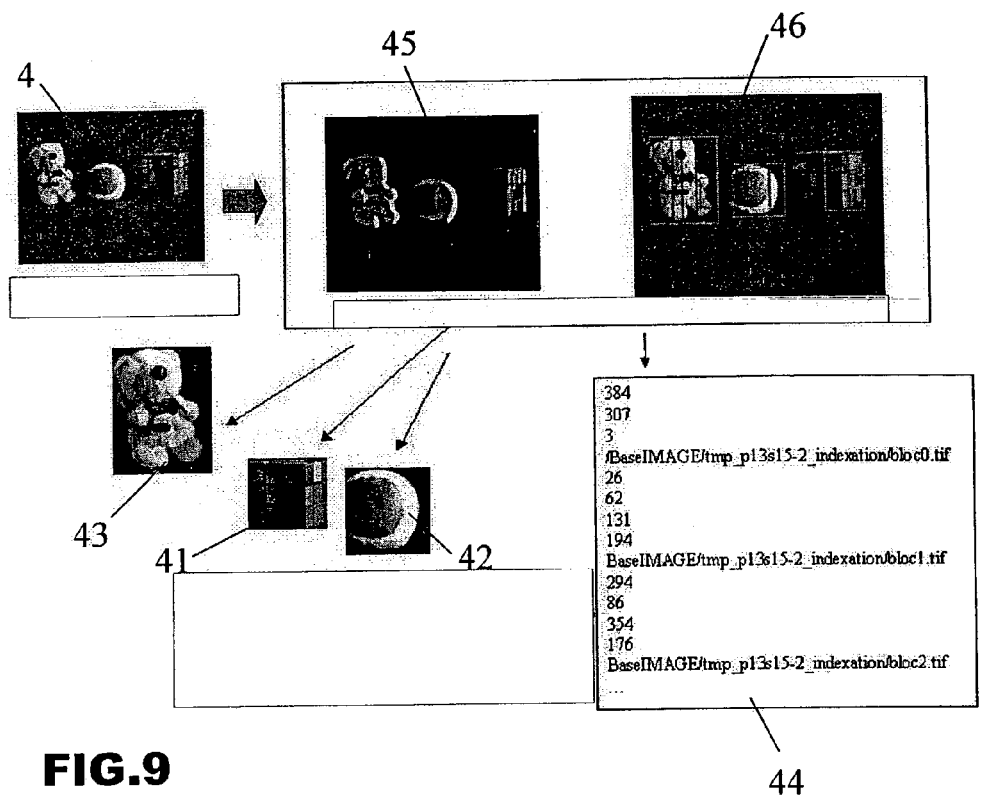
FIG. 9 is a diagram showing the result of a representation process during the perceptual analysis of FIG. 6.

There follows a description with reference to FIGS. 7 to 9 of an example of a segmentation module 131.

FIG. 7 shows an example of a segmentation module 131 implementing various segmentation methods based on different criteria (color, texture, . . . ) in order to increase robustness significantly and in order to enlarge the spectrum of images that are processed properly.

A first segmentation submodule 51 acts on textures (investigating and characterizing the space and frequency distribution of gray levels in an image). An image 6 is subdivided into a plurality of regions 61, 62 in which each image is of uniform appearance with differing statistical and visual properties. One method that gives good results is based on space and frequency filtering of the image. The raw image is split up into a plurality of frequency bands and a multiscale split is used that is obtained by applying a wavelet having as characteristics good localization both in the frequency domain and in the space domain.

A second segmentation submodule 52 is based on chromatic and achromatic analysis and serves to identify a region 63 where an object is isolated from the context;

A third segmentation submodule 53 is based on detecting outlines with an optimum filter and serves to identify regions 64, 65 each receiving an object.

A fusion module 54 serves to increase the robustness and the performance of the segmentation. Fusion consists in putting together the results of the various segmentation submodules 51 to 53. The fusion module 54 selects the object(s) in full or in part as revealed by the majority of the segmentation submodules 51 to 53.

In FIG. 7, the selected object 66 corresponds to the objects 61, 63, and 64 as selected by the three submodules 51 to 53 while the selected object 67 corresponds to the object 65 that was selected in full by submodule 53 and to the object 62 that was selected in part by the submodule 51.

The segmentation submodule 51 serves to detect texture characteristics using filtering that is equivalent to a bank of highpass and lowpass filters acting on the color image 6 that is to be segmented. The submodule 51 outputs segmented thumbnail images 61, 62 of the objects $(A_i)$ together with a file of coordinates for boxes covering the objects.

The wavelet transform serves to obtain unique information relating to the frequency domain of the image. The wavelet transform provides good localization in the space and frequency domains, in particular in the texture domain and it is found to have higher performance than methods making use of co-occurrence matrices or of the Fourier transform.

An optimized method for extracting and characterizing the components of the images presents the following characteristics:

A wavelet transform is preferably of the recursive type and presents lowpass and highpass filters that are preferably of size 5, although nearby sizes, e.g. 4 or 6, could also be envisaged.

A lowpass linear filter of size 5 is characterized by indices $a_0$ to $a_5$ and $b_1$ to $b_4$ as follows:

$$y(i) = a_5 * x(i-5) + a_4 * x(i-4) +$$
$$a_3 * x(i-3) + a_2 * x(i-2) + a_1 * x(i-1) + a_0 * x(i) +$$
$$b_4 * y(i-4) + b_3 * y(i-3) + b_2 * y(i-2) + b_1 * y(i-1)$$

A highpass linear filter of size 5 is characterized by indices $c_0$ to $C_5$ and $d_1$ to $d_4$ as follows:

$$y(i) = c_5 * x(i-5) + c_4 * x(i-4) +$$
$$c_3 * x(i-3) + c_2 * x(i-2) + c_1 * x(i-1) + c_0 * x(i) +$$
$$d_4 * y(i-4) + d_3 * y(i-3) + d_2 * y(i-2) + d_1 * y(i-1)$$

Good results have been obtained by selecting the following values for example $a_0=0.5$, $b_1=0.5$, $c_0=0.5$, $d_1=-0.5$, with all of the other coefficients being zero.

The result of this splitting by means of lowpass and highpass filters is a three-dimensional attribute matrix, in which each element (i,j) of the matrix is a vector characterizing the distribution of pixel values in the vicinity of point (i,j).

In order to reduce computation time, it is possible to perform a parameterized decimation step, i.e. dividing the number of images obtained by $2^n$, after each filtering operation performed on images of high resolution or large size, so as to reduce the amount of data that needs to be processed. The integer number n increases with increasing resolution.

The process of transformation into wavelets using a lowpass filter and a highpass filter is performed both on the rows and then on the columns of the image.

The transformation process can be reiterated several times over n stages, e.g. two or three stages.

After a smoothing stage, the size of the attribute matrix can be reduced in depth by retaining only the [2n+(n−1)] images that contain the most detail, where n is the number of stages.

When reducing the number of images (e.g. so as to retain only eight images out of sixty-four images when n=3), it is possible to conserve a first image that is the result of applying the lowpass filter in each of the two directions, to eliminate an image that is the result of applying the highpass filter in the two directions, and to proceed with successive comparisons between the remaining images, implementing fusions, where appropriate, so as to obtain the other (2n+n−2) images that are to be retained.

It is also possible to use a method based on principal component analysis of the attribute matrix.

In order to reduce the fluctuation between the pixel attribute vectors of the same texture, a process is implemented to seek the partitioning of the attribute matrix which is best in terms of a given criterion, e.g. maximizing energy, thus leading to an image of regions in which the pixels in any one region having similar attributes all have the same label. To do this, it is possible to use a c-means algorithm. This technique which is also known as "clustering" consists in grouping pixels or groups of pixels together in identical classes when their characteristics tend to form clusters in parameter space.

The result of this distribution is a labeled image in which pixels from any one uniform zone all have the same label.

This image is processed to identify the objects and their covering box.

This is done in two steps:
adjacent pixels having the same label are agglutinated to generate a covering envelope; and
fusing regions, e.g. by fusing small objects which are included in a larger object.

FIG. 8 is a diagram showing the wavelet transform implemented in submodule 51.

FIG. 8 shows by way of example the image 6 on which the first step is to implement highpass and lowpass filtering 161 and 162 on rows followed by a step 163 of dividing the number of images by 2 so as to obtain images 7 and 8 respectively, each of which is subjected to highpass filtering 164, 166 respectively and lowpass filtering 165, 167 respectively on its columns, followed by another step 168 of dividing the number of images by 2 so as to obtain four images in this example.

The segmentation submodule 52 performs chromatic and achromatic detection on the basis of the original color image 6 that is to be segmented. The subassembly 52 outputs segmented thumbnail images 63 of the object ($B_i$) and a file giving the coordinates of the boxes that cover the objects.

Object extraction is performed in a plurality of sequential steps:
the image is converted to the hue-saturation-value (HSV) model;
achromatic propagation is performed to eliminate the background;
on the first iteration, opening is performed (in order to eliminate noise and to reconnect regions) in the event of non-convergence at the end of this first iteration, and closing is performed for the second iteration;
labeling algorithm is launched; and
covering boxes are created for each of the objects found.

The segmentation submodule 53 detects outlines by implementing a modified optimum filter on the basis of the original color image C that is to be segmented. The submodule 53 outputs segmented thumbnail images 64, 65 of the objects ($C_i$) together with a file giving the coordinates of the boxes covering the objects.

Objects are extracted by implementing a plurality of sequential steps:
the image is converted into red-green-blue (RGB) space in a single luminance plane;
an averager is used to eliminate noise associated with acquisition;
horizontal gradients and vertical gradients are computed;
the two gradient images are summed in order to obtain a single image;
the minimum and the maximum of this image are computed in order to determine the high and low values needed for thresholding by hysteresis;
this consists in setting all image values that are below the low threshold to 0, and setting all of the image values that are above the high threshold to 1. For image values lying between the low and high thresholds, the decision whether to opt for a 0 or for a 1 depends on how similar a pixel is to its binary neighbors;
morphological opening is performed;
multiple morphological closures are performed;
a labeling algorithm is launched; and
boxes covering each found object are created.

Using the covering boxes revealed by the segmentation submodules or segmenters 51, 52, and 53, module 54 (shown in FIG. 7) proceeds with fusing the segmentations.

The objects sent by each of the three segmenters 51, 52, and 53 are classified in a list as a function of size in decreasing order. For each unprocessed object in the list, its overlap with the other unprocessed objects of smaller size is computed. Objects having a large overlap are declared as being a selected object.

If this algorithm is applied to the example of FIG. 7, the following is obtained:
the n objects from the segmenters are ordered in order of decreasing area so as to obtain a list. In this example L=(A1, B1, C1, C2, A2), where A1, A2, B1, C1, C2 represent the segmented thumbnail images 61 to 65;
so long as there remain objects in the list that have not yet to be visited:
the first free element in the list is taken and a search is made for overlap between said element and the following free elements in the list;
if there is an overlap between objects from different segmenters, then a graph is constructed and these items are marked as being processed, i.e. no longer free;
in the example of FIG. 7, two graphs are obtained:
G1: A1-B1-C1
G2: C2-A2
the same procedure is applied, after the list has been reversed so as to eliminate empty elements. This likewise provides two graphs:
G1: A2-C2
G2: C1-B1-A1 the results are pooled so as to obtain results that are reliable since they combine the preceding likely things.

By means of this method, it is possible to work with varying numbers of segmenters.

FIG. 9 shows what can be obtained at the output from the module for fusing the segmentations using the demonstration example image 4 of FIG. 1;

The segmented objects are referenced 41, 42, 43 and the file with the coordinates of the covering boxes for the objects is referenced 44.

References 45 and 46 show the results of intermediate steps of segmentation and of fusion.

Figure 6:
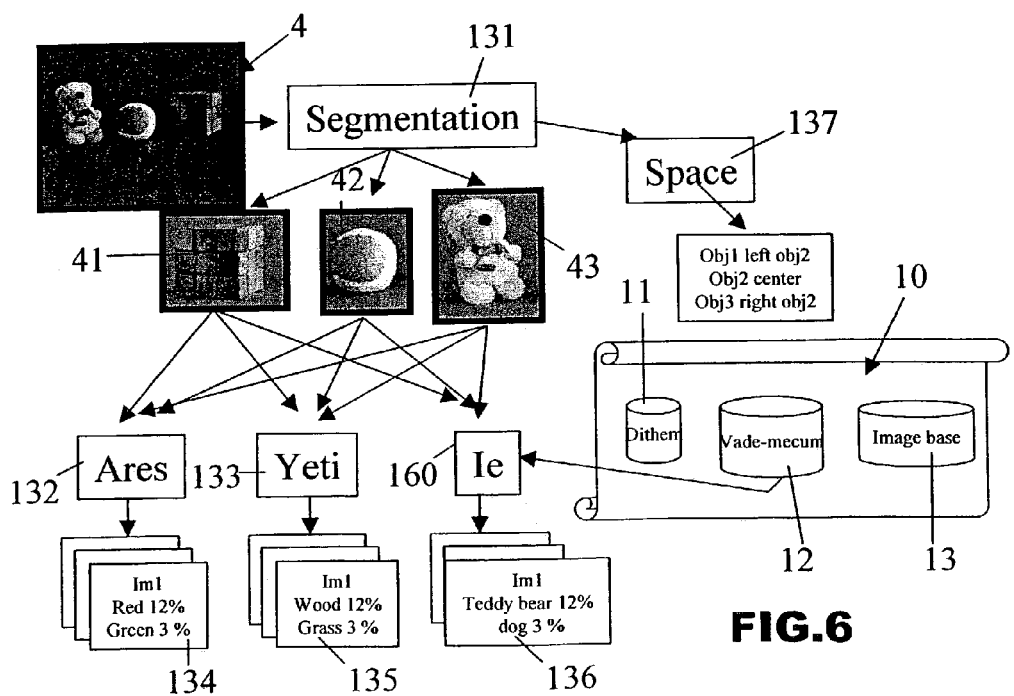
FIG. 6 is a diagram showing the general architecture of perceptual analysis performed in the context of the indexing process of FIG. 5.

As can be seen in FIG. 6, the segmented objects are subjected locally to a set of various processes in modules 132, 133, 160, 137 that form parts of the perceptual analysis function 130. These various processes can also be applied to the overall analysis of the image. Nevertheless, for simplification purposes, these processes are described only with reference to local processing on the segmented objects 41, 42, and 43.

Figure 10:
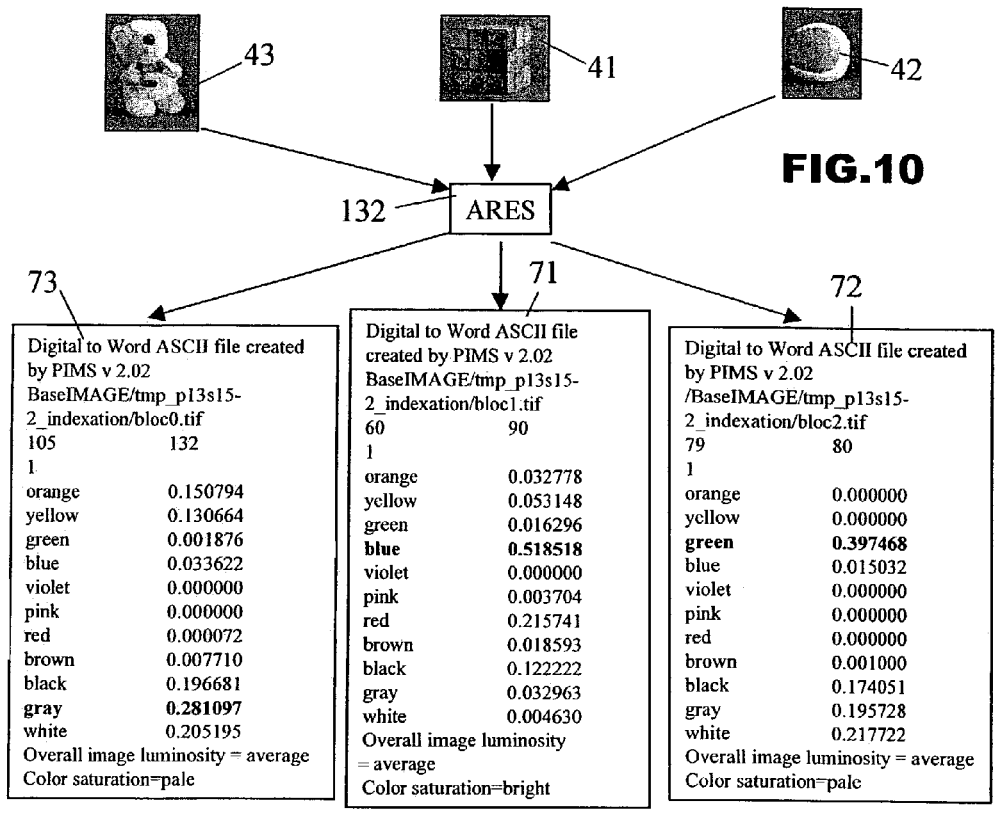
FIG. 10 is a diagram of an ARES module for making use of the inherent properties of color, and used in the context of the perceptual analysis of FIG. 6.

The module 132 called ARES shown in FIG. 10 makes use of the properties inherent to color and uses histograms to perform analysis to search for images that are similar.

The algorithm implemented in the module 132 is intended to find the distribution of colors constituting the input image and it also serves to generate corresponding natural language terms.

The information supplied to the input of the module 132 comprises a color input image 41, 42, 43, rectangular boxes covering the objects, binary masks for the objects, and the definition of a chromatic subdivision with HSV histograms for each of the colors identified in a chromatic dictionary.

The module 132 outputs a text file 71, 72, 73 containing words describing the basic hues together with numerical values representing the percentage presence of each hue in the image.

The sequential operations performed by the module 132 are as follows:
  it reads the file containing the input image;
  it reads the information describing an object:
    the text file of the rectangular boxes covering the objects as produced by the segmenter; and
    the binary mask file encoding the shape of the object;
  it reads the text file giving the chromatic spectrum subdivision constituting a chromatic dictionary;
  it isolates objects in the input image using values defining the covering box and the binary mask;
  for each object it characterizes its color:
    it converts the object into HSV color space;
    it computes a histogram for the object: matching the histogram with the chromatic dictionary:
      it normalizes the image to obtain a histogram that is independent of picture-taking conditions: scale invariance. Scale invariance processing consists in normalizing different sizes of images so that the final histogram is identical regardless of the original areas of the images; and
      for each range in the histogram, it produces a textual characterization of the corresponding color and a description of the overall luminance and saturation of the object;
  it saves the results for each object.

The files 71, 72, 73 shown in FIG. 10 give examples of results for the segmented object images 41, 42, 43.

Figure 11:
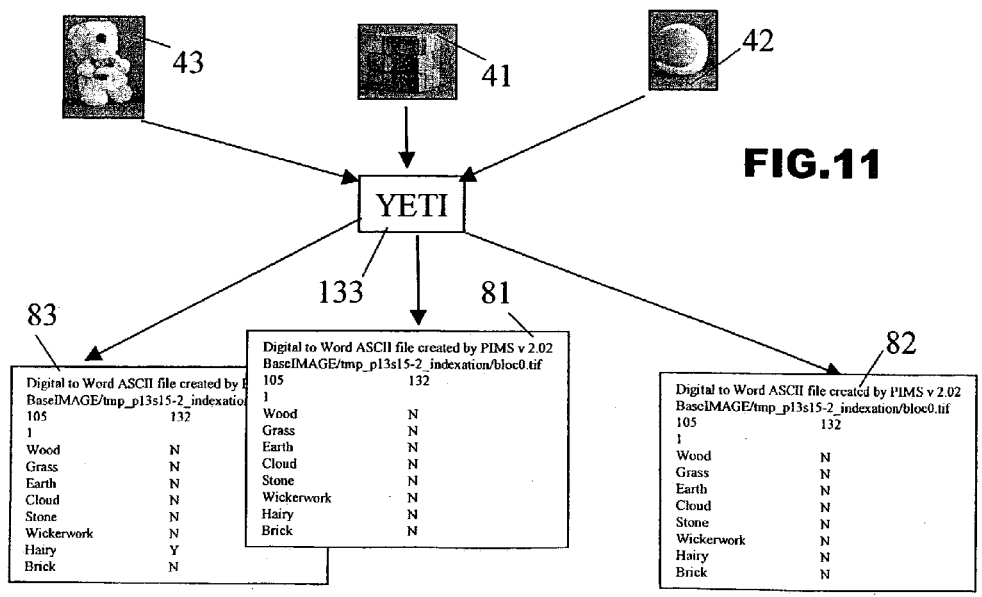
FIG. 11 is a diagram of the YETI module for making use of the texture characteristics of images, as used in the context of the perceptual analysis of FIG. 6.

The module 133 called YETI and shown in FIG. 11 makes use of the texture characteristics of the images and implements a wavelet transform.

The algorithm implemented in the module 133 seeks to find the distribution of textures constituting the input image, and it also makes it possible to generate corresponding natural language terms.

The information input to the module 133 comprises the thumbnail image of the object 41, 42, 43, an indexed texture dictionary, and the number of stages of the wavelet filter.

The module 133 outputs a text file 81, 82, 83 listing the textures present or absent in the input image.

The module 133 essentially performs frequency and space analysis at different scales. The visual criteria which are used for determining texture are contrast, granularity, orientation, shape, fineness, regularity, and roughness.

The method implemented for extracting, identifying, and characterizing components of images is based on using a wavelet transform, i.e. space and frequency filtering performed on segmented thumbnail images split up into a plurality of frequency bands. The multiscale split that is used is obtained by applying a wavelet whose characteristic is good quality localization in the space and frequency domains. The result of this split is an attribute matrix in which, after a smoothing stage for reducing first order statistical fluctuations between attribute vectors of pixels of the same kind, a search is performed for the partitioning of the attribute matrix that is best in terms of a given criterion, e.g. maximizing energy. One of the possible techniques is based on the k-means algorithm.

One-to-one correspondences between language and texture modules have been established in a texture dictionary that is used as a reference.

The sequential operations performed by the module 133 are as follows:
  reading the image;
  using the wavelet transform (as a function of the number of stages placed in the input) so as to obtain $4^n$ filtered images;
  reducing the number of filtered images to $2n+(n-1)$ images;
  classifying pixels relative to the nearest adjacent pixels that are similar. Applying the k-means algorithm;
  creating a vector of characteristics and then comparing it with the vectors that are characteristic of textures in the dictionary;
  calculating the Reiman distance between the vectors; and
  saving the list of textures produced that are present or absent in the input image.

The files 81, 82, 83 of FIG. 11 give examples of such results for the segmented object images 41, 42, 43.

Figure 12:
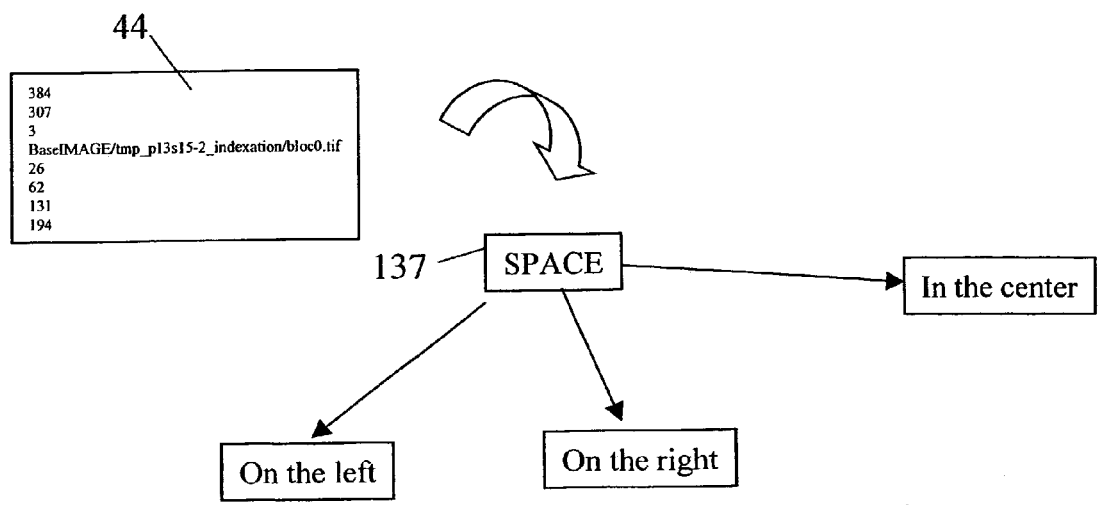
FIG. 12 is a diagram of the SPACE module for locating the various elements in the image, as used in the context of the perceptual analysis of FIG. 6.

A module 137 called SPACE and shown in FIG. 12 serves to locate the various elements of the image and to determine the geometrical locations of the objects relative to one another in order to express them in natural language using locative prepositions.

The module 137 receives the file 44 of coordinates for the boxes covering the objects and it outputs a file expressing the spatial relationships between the various objects in natural language.

Several levels of representation of spatial relationships between the objects of an image can be defined to describe the semantics of the image and to generate a textual description of each image.

For example:
  when the spatial relationship designates a family of relationships, it is said to be of a "first level" and this category includes the following relationships: in, on, at, etc.; and when the spatial relationship is a particular relationship, it is referred to as a "two-level" relationship. Under such circumstances, the second level is used for specifying the direction of the relationship described by the first level, for example terms such as high and low are two-level relationships.

The textual description of the images can also comprise geometrical aspects such as the shape or the size of the various objects and the relationships involved (e.g. round, rectangular, fine, long, smaller, larger, . . . ).

The module 137 can thus implement the following steps sequentially:
  reading the coordinate file;
  finding the covering box having the largest area which then becomes the main object (e.g. Obj1);
  for this main object, finding its location in the photo. To do this, it suffices to compare the coordinates of its covering box with the placement rules that have been predefined. For an example having four objects Obj1 to Obj4, it is thus possible to have the following:
    Obj1 is in the middle of the image;
  then taking each of the other objects and seeking to place them relative to the main object using new placement rules. In the same example, this gives:
    Obj2 to left of Obj1;
    Obj3 to right of Obj1;
    Obj4 to left of Obj1;
  then looking for possible transitive relationships between the objects. This gives:
    Obj4 to left of Obj2;
  generating an output file describing the spatial relationships between the components of the image.

Figure 13:
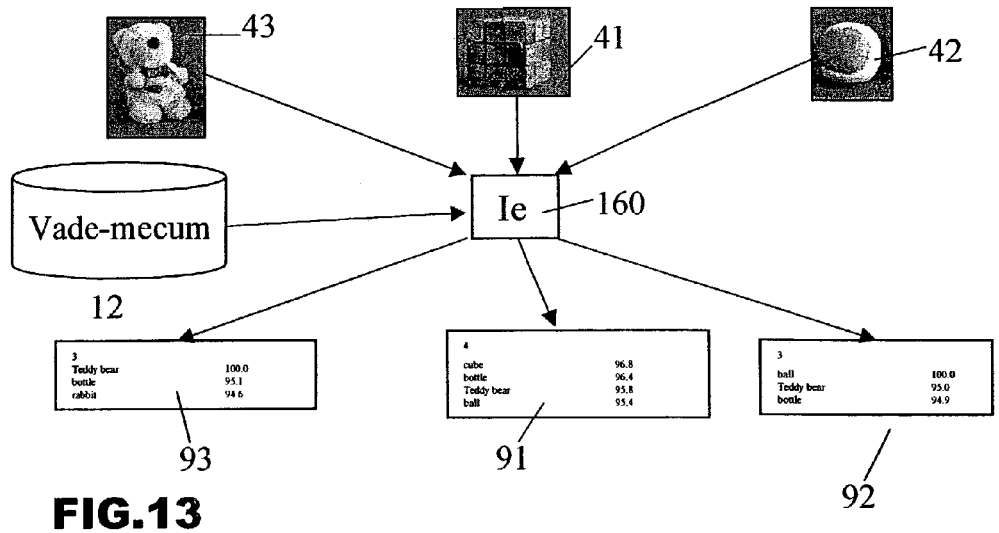
FIG. 13 is a diagram showing the Ie module for object recognition, as used in the context of the perceptual analysis of FIG. 6.

The module 160 referred to as an image explorer (Ie) is shown in greater detail in FIG. 13 and is used to recognize objects. This module thus serves for each of the objects revealed by the segmentation module 131 to recognize the object so as to be able to name it.

For each object, the module 160 receives an entire thumbnail image file of the object 41, 42, 43 and it co-operates with the vade-mecum 12.

For each object 41, 42, 43, the module 160 outputs a list 91, 92, 93 of concepts which are recognized as being candidates after making comparisons with the database of the vade-mecum 12, and these concepts are associated with pertinence levels.

To extract and characterize invariant properties from an image and its components, use is made in particular of the method described in documents FR 2 753 820 and FR 2 779 868, for detecting these points of interest, and then triangulation is performed in order to extract a mesh from which local characteristics are computed that are robust in the face of transformations that are common in picture-taking (Zernike's moments).

The search base is constituted by the vade-mecum 12 which has already been indexed in pictorial manner.

The vade-mecum database is thus interrogated using the object that is to be named as the question.

The module 160 produces a list 91, 92, 93 of concepts that match the image, together with their pertinence levels, on the basis of mathematical traits that are common both to the image that is to be recognized and to the objects in the vade-mecum database 12.

Once the perceptual analysis 130 of FIG. 5 has been performed, and after the various components of the image to be analyzed have been identified, it is necessary to perform a step 140 of semiotic analysis. This step consists in determining high level relationships that exist between the various components that have already been revealed, and in arranging the various signatures previously obtained in a particular manner. This step provides the most precise description possible of the image in question in order to be able to perform as broad a search as possible, and also in order to be able to adapt the text that is produced as a function of the profile of the user.

Figure 14:
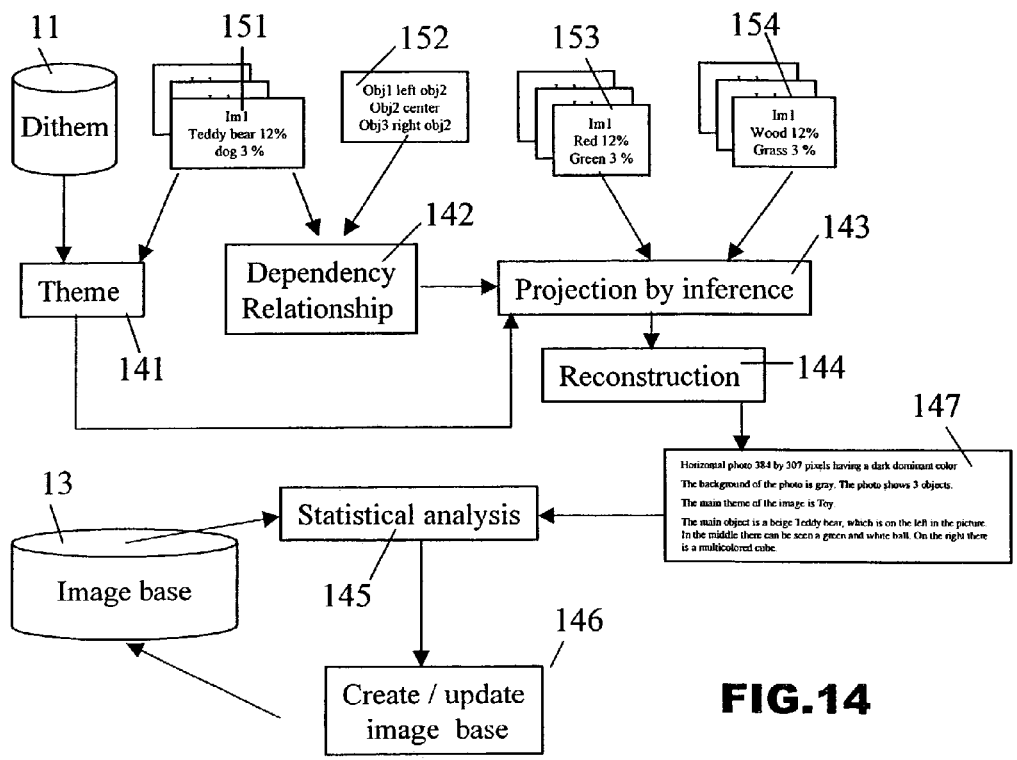
FIG. 14 is a diagram showing the general architecture of semiotic analysis performed in the context of the indexing process of FIG. 5.

The semiotic analysis shown in FIG. 14 makes use of the theme dictionary 11, the files 151 output by the module 137 for locating the various elements in the image, the files 153 output by the module 132 for making use of the properties inherent to color, and the files 154 output by the module 133 for making use of the texture characteristics of the images.

Semiotic analysis comprises various steps shown in FIG. 14, namely a step 141 of seeking the theme of the image to be indexed, a step 142 of generating a dependency relationship between the objects present in the image, a step 143 of projection by inference, a step 144 of reconstructing and generating text 147, a step 145 of statistical analysis applied to the text 147 that is produced, and a step 146 of creating or updating the image database 13.

The various above-specified steps 141 to 146 of the semiotic analysis are described below in greater detail with reference to FIGS. 15 to 19.

Figure 15:
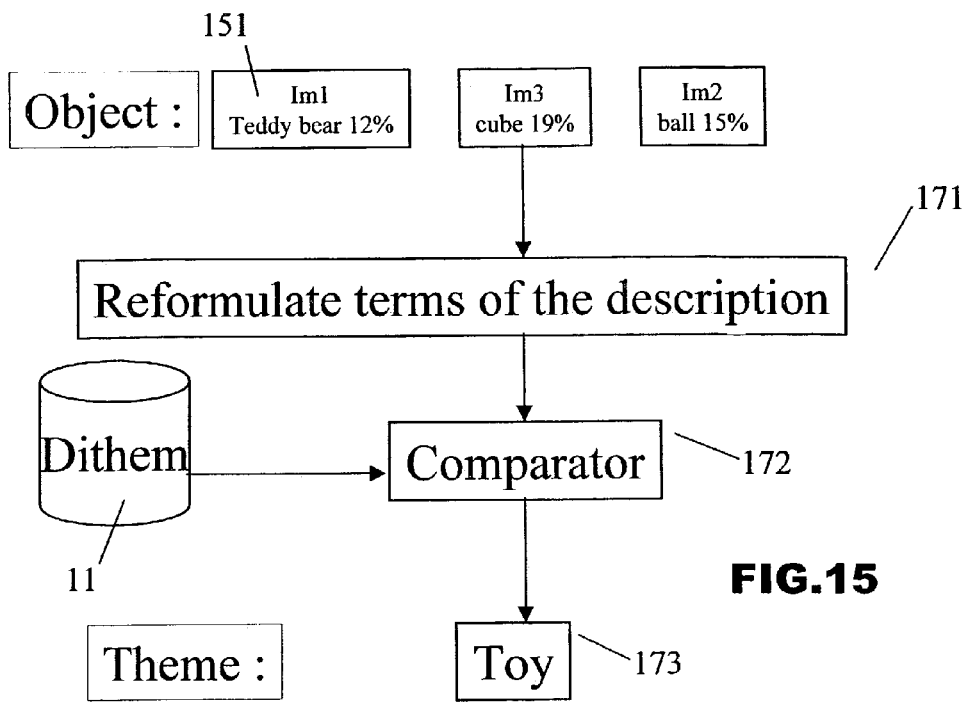
FIG. 15 is a diagram of a theme search module forming part of the semiotic analysis shown in FIG. 14.

Step 141 shown in FIG. 15 consists in determining whether a general theme can be revealed in the image to be analyzed.

The search for the theme of the image to be analyzed, on the basis of a file 151 output by the object recognizer module 160 comprises a first step 171 of reformulating the terms of the image description and a second step 172 of comparing a description of the image or a question with the database 11 constituting a dictionary of thematic information.

The purpose of the reformulation module 171 is to reformulate the terms revealed by the object recognizer module 160 in order to find synonyms. Thus, in the example shown in FIG. 15, the term "teddy bear" which is the word associated with the object 1 might be reformulated as "bear".

The comparison module 172 serves to compare the terms of the image description as constituted by the names of each of the objects, with possible reformulations, and with the documents contained in the theme dictionary 11.

To sum up, step 141 for determining the possible existence of a general theme with which the image under examination can be associated consists initially, for each object, in reading from the file output by the object recognizer module the most likely name for the object and in formulating the question by concatenating the names of the various objects identified in the image.

With each name, step 171 is then implemented which consists in seeking to reformulate the name and the result of this step is concatenated with the question.

The question requires the services of a comparator 172, an example of which is described in greater detail below, making use of the theme dictionary 11 as its interrogation base.

The comparator 172 receives a description of the image, i.e. a question, and it co-operates with the theme dictionary 11 to output a list of results classes.

The comparator 172 operates as follows:

To make the comparison, a pertinence computation is performed which depends:
  on the size and the quality of the overlap between the description of the image and the reference document in the database, i.e.:

the information value of the words in the image description relative to the content of the database 11; and the number of image description words present in the document;

on the presence of grammatical links between the words of the image description found in the document.

The information value of a word is considered as being greater for increasing rarity of the word in the base. For example, in a document base concerning atomic energy, the term "nuclear" provides little discrimination since it is present in the majority of the documents of the base. Its information weight is therefore small.

Furthermore, if two words of the image description possess a grammatical link in the question, and in particular a link that is internal to a nominal group, then themes stored in the theme dictionary 11 containing these words linked by a grammatical relationship are considered as being more pertinent than themes containing the same words but not linked to one another.

For example, if the question is M1[M2 M3]M4 where M2 and M3 are grammatically linked together:

a theme containing M1 and M3 will have a weight P(M1)+P(M3) where P(x) designates the information weight of word x;

a theme containing M1, M2, and M3 will have as its weight: P(M1)+P(M2)+P(M3); and a theme containing M1 and [M2 M3] will have as its weight: P(M1)+2*P(M2 M3)

For example, if objects such as knife, a fork, a glass, and a plate are found in an image, it is possible to assert that the image relates to conceptual relationships associated with a meal.

In the example of FIG. 15, the result 173 of the theme search is represented by the word "toy". When no theme has been found, the result can be given merely by the term "none".

Figure 16:
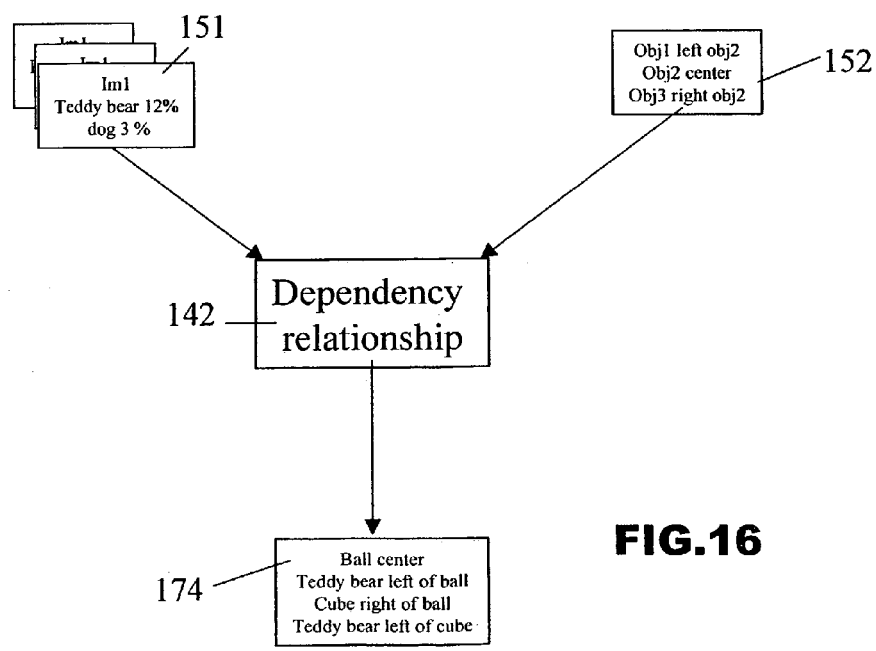
FIG. 16 is a diagram of a module for searching dependency relationships forming part of the semiotic analysis shown in FIG. 14.

The process of establishing dependency relationships 142 from the file 151 output by the module object recognizer module 160 and the file 152 output by the module 160 for locating the various elements of the image is described below with reference to FIG. 16.

During the process of establishing dependency relationships, a search is made to establish high level spatial relationships between the objects present in the image.

As mentioned above, in the spatial locating module 160, it is possible for example to specify that object A is the largest object in the photo, that it is situated to the left of the image, . . . . In module 142, it is desired to establish relationships that are more subjective, such as:

transitivity: if A is to the left of B, if B is to the left of C, then A is to the left of C;

synonymity: if A is at the top of the image, if B is at the bottom of the image, and if A and B have similar abscissa coordinates, then it must be possible to say that A is above B or that B is below A.

With precise relationships of the above type, the quality of the descriptions can be greatly improved.

The dependency relationships that have just been revealed appear in the file 174 output from the module 142.

The inference projection module 143 which uses a knowledge base including the vade-mecum 12 is described below with reference to FIG. 17.

The module 143 receives inputs for each of the objects that result from the module 142 for establishing dependency relationship, the results from the module 133 for searching texture, and the results from the module 132 for making use of the properties inherent to color.

The module 147 generates a text file for each of the concepts that it has been possible to reformulate and enrich.

For each object, after reading the files containing the results from modules 132, 133, and 142 as described above, and after reading the input corresponding to the object in question in the vade-mecum 12, a comparison is performed between the attributes read from the vade-mecum 12 and those obtained by observing the object in question.

If this comparison reveals a correspondence, then a phrase is generated showing the concept that has been identified, and the result is saved.

Figure 17:
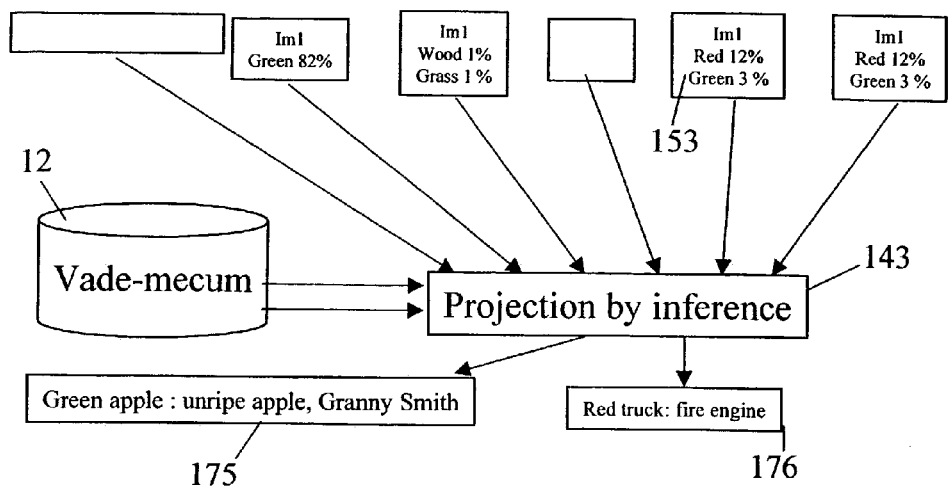
FIG. 17 is a diagram of an inference projection module forming part of the semiotic analysis shown in FIG. 14.

For example, FIG. 17 shows the results 175, 176 of concepts that were reformulated following step 143 of projection by inference.

Result 175 shows that the definition of the "object" referred to as a "green apple" could be reformulated as "unripe apple" or as "Granny Smith", whereas result 170 shows that an object defined as a "red truck" could be reformulated as "fire engine". The reformulated concepts are added to the descriptions of the objects, refining them but not replacing them.

Figure 18:
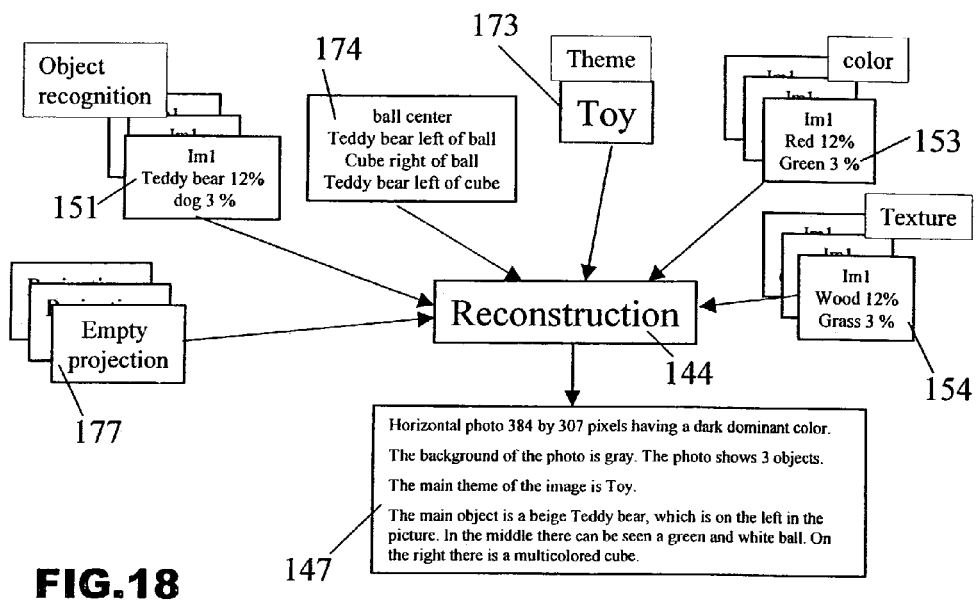
FIG. 18 is a diagram of a reconstruction module forming part of the semiotic analysis shown in FIG. 14.

FIG. 18 shows step 144 of reconstructing or generating text that forms a part of the semiotic analysis 140. In this step, and on the basis of the files 151, 152, 153 coming respectively from the object recognizer module 160, from the module 132 for exploiting the properties inherent to color, and from the module 133 for exploiting the texture characteristics of the images, and also from the files 173, 174 coming respectively from the module 141 that finds a theme and the module 142 that produces dependency relationships, a text 147 is generated suitable for indexing the image.

Figure 19:
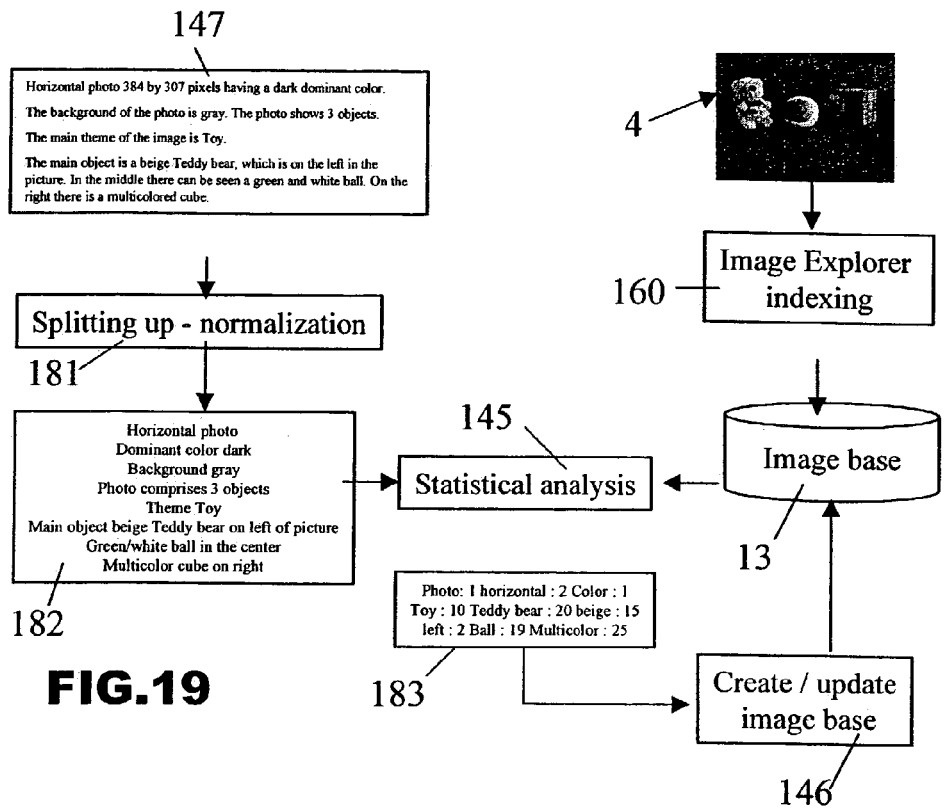
FIG. 19 shows the implementation of a statistical analysis module forming part of the semiotic analysis shown in FIG. 14.

FIG. 19 shows the statistical analysis step 145 which serves to terminate the process of indexing the image.

Once the images have been described textually in the form of files 147 on the basis of their symbolic representations, they are indexed by means of a text search engine. To do this, techniques are used that are similar to those that have already been used during theme indexing, in particular. Thus, a subdividing and normalizing first step 181 is performed that is analogous to the step 112 of FIG. 3, and then statistical analysis is performed that is analogous to step 114 of FIG. 3, but this time using images that have already been indexed, or more precisely using their indexing text 182.

The system for indexing the text base gives a semantic weight to each simple or compound word, on the basis of a statistical model generated using all of the meaningful words. The weights as computed in this way are then used during interrogation, specifically by the module for comparing questions with documents. Its role is then to find the semantic proximity between documents in the base and a query.

Thereafter, syntactic analysis gives each word of the text of the description a grammatical category. As a function of these categories, the analyzer distinguishes between utility words (empty) and meaningful words (full). Only meaningful words are retained for satisfying the needs of documentary searching. For example, when analyzing the sentence "in the room, there are a bed and a table", only the words "room", "table", and "bed" are considered being meaningful words, the other words being considered as being empty words.

Once all of the textual indexing data is available in a file 183, a procedure of pictorially indexing the image 4 can be launched, e.g. using an object recognizer module 160 implementing the method described in patent application FR 2 779 848.

Finally, a step 146 is performed of creating or updating (filling in fields) the image base 13. For example, it is possible to use the multilingual textual search engine known under the name SPIRIT, to perform this last part of the indexing process.

The indexing program of the invention thus takes place entirely automatically.

As an option, it is nevertheless possible to make provision for displaying an inspection screen at the end of the process of indexing an image so as to allow an operator to see the result of such a process.

Figure 20:
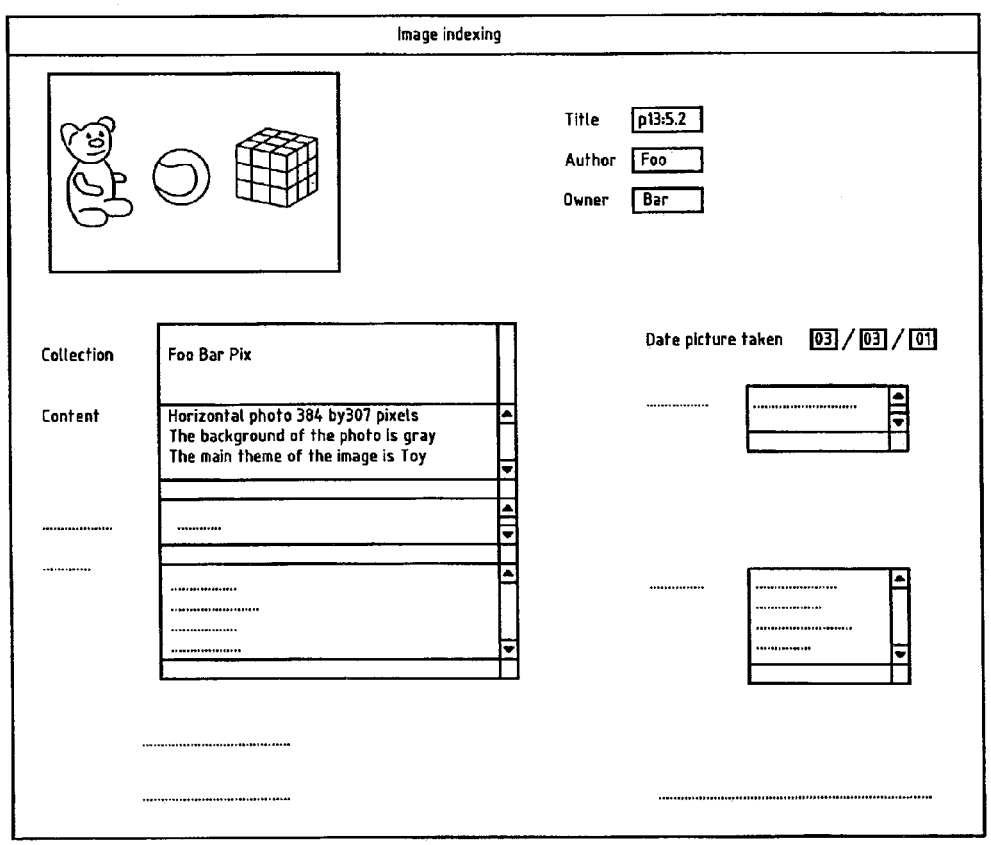
FIG. 20 shows an example of a screen for indexing an image integrated in a knowledge base in accordance with the invention.

FIG. 20 shows one possible example of a screen displaying information relating to the end of the process of indexing an image.

An example of the method of searching for an image in a knowledge base 10 created automatically in accordance with the method of the invention and comprising an image base 13 in which objects, i.e. image components, have been segmented, located, and stored, is described below with reference to FIGS. 21 to 27.

During the search stage, the idea is to find images in the base that satisfy queries made by users. Interrogation and consultation are performed in dual mode manner, i.e. both on text and on images.

If a question is put in natural language, possibly in several languages, it is reformulated so as to cover the widest possible spectrum.

The textural search engine then serves to find images that match the data in the image base 13.

If a question is put in the form of an image, i.e. an image fragment or an image similar to the image that is being looked for, then a pictorial search is performed.

Textural and pictorial searches can naturally be combined with each other.

Figure 21:
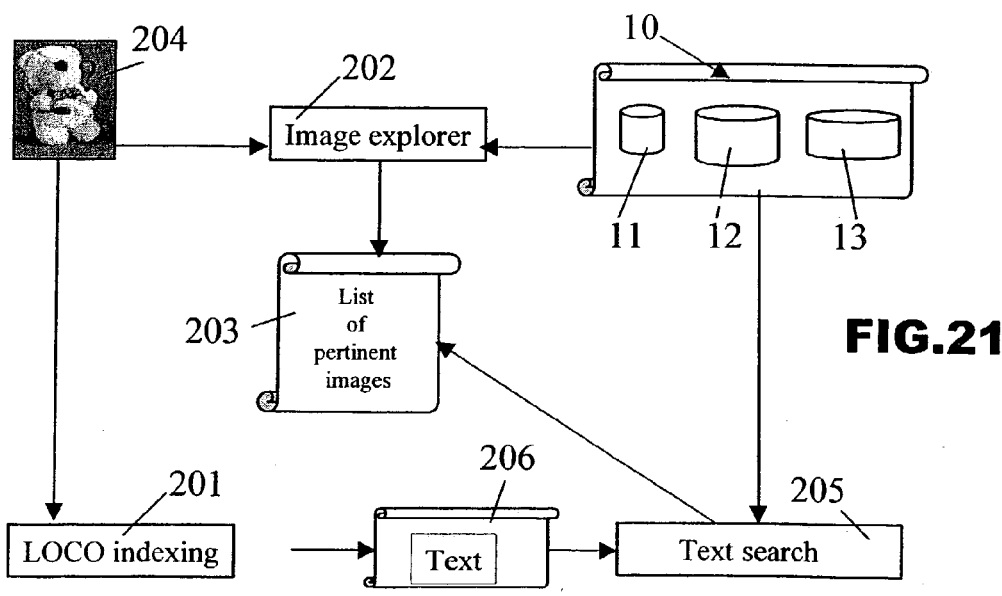
FIG. 21 shows the general architecture for a picture search in a knowledge base implemented in accordance with the invention.

FIG. 21 shows the general architecture of a pictorial search method.

A user can search for images similar to a query image 204. In step 201, characteristics are extracted from the query image 204 using the same process as that described above for indexing an image.

This provides a text 206 describing an image and constituting a signature of said image. In a stage 205 of performing a text search through the knowledge base 10, a similarity distance is computed between the query signature 206 and all of the signatures in the base 10. The responses are then sorted by order of similarity and a list 203 of pertinent images is obtained.

An object recognizer module 202 is used in association with the query image 204 and the knowledge base 10.

The pictorial search is then performed using the visual characteristics of the images and low level signatures (colors, shapes).

Figure 22:
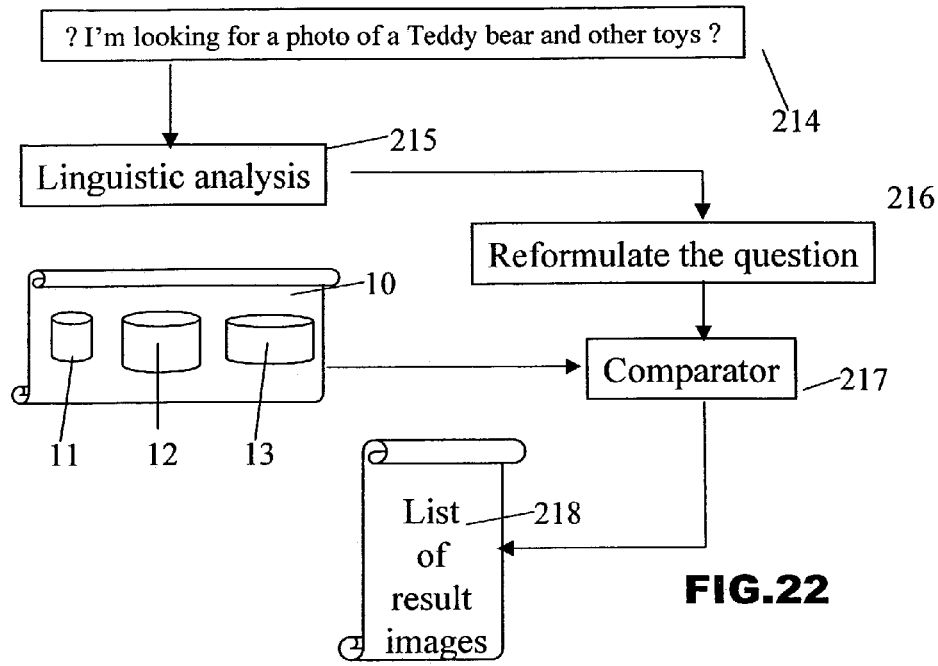
FIG. 22 shows the general architecture of a textual search in a knowledge base implemented in accordance with the invention.

FIG. 22 shows the general architecture of a textual search method.

In this type of search, the user formulates a question in natural language (step 214). By way of example, the user can formulate the following question: "I'm looking for a photo containing a teddy bear and other toys".

This question is then recovered and processed.

The method of processing a question comprises a step 215 of linguistic analysis, a step 216 of reformulating the question, and a step 217 of making a comparison with the documents in the image base 13.

A degree of semantic proximity is calculated between the question and all of the textual descriptions of images in the image base 13. Thereafter, the reply documents are ordered depending on their degree of semantic proximity so as to obtain a list 218 of result images.

In order to establish the semantic similarity between the meaningful words of the query and the information content of the documents in the base, initial processing is performed to index the text base by identifying meaningful words and a second process is performed concerning the morpho-syntactical analysis of the request.

Figure 23:
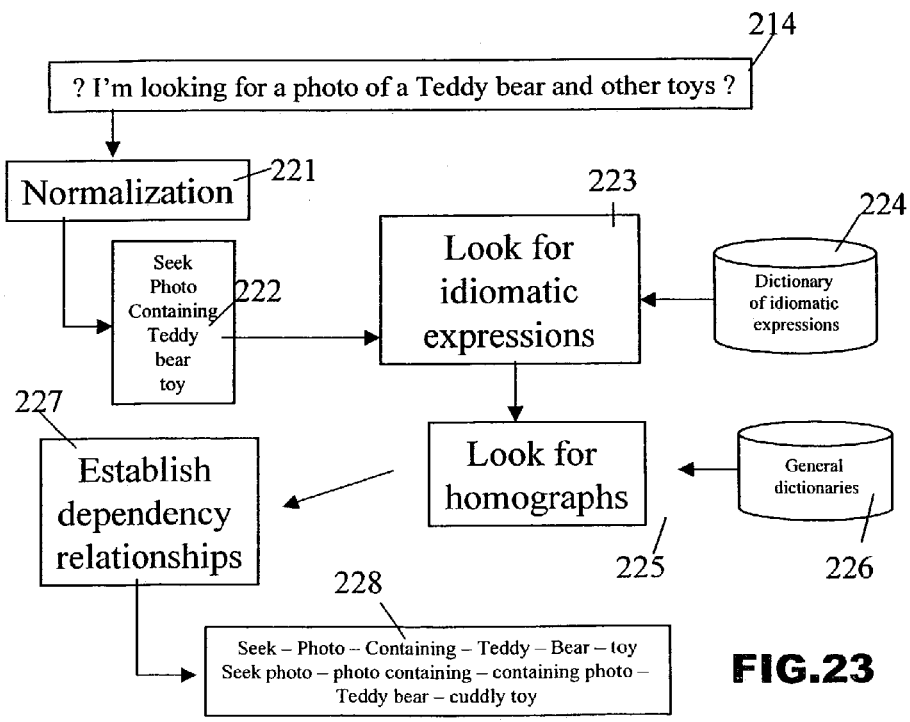
FIG. 23 shows a linguistic analysis module forming part of the textual search in FIG. 22.

FIG. 23 shows the various modules implemented in the linguistic analysis step 215.

The text search stage relies on a linguistic analysis step 215 similar to that performed when indexing the description texts of the theme dictionary 11. This linguistic analysis thus makes it possible:

to recognize various categories of words (plural/singular, masculine/feminine, logo, . . . ); and to eliminate syntactical ambiguities.

The linguistic analyzer provides two data structures: the first contains the words in question in their original form (as expressed in the question), and the second contains the meaningful (full) words in canonical form. These words, idiomatic expressions (sayings) and logos are considered as being key words.

The purpose of the first data structure is to be able to read the words in their original form when displaying the results classes. The interrogator can thus find the words actually used in the question.

Linguistic analysis comprises a normalization step 221 in which the text is subdivided into known units which make up a list 222. Thereafter, using a dictionary 224 of idiomatic expressions, the method moves onto step 223 of searching for idiomatic expressions. Thereafter, using general dictionaries 226, the method moves onto step 225 of looking for homographs, and then in a step 227 the method proceeds with setting up dependency relationships. This provides a list 228 of words or expressions, after which the method moves onto step 216 of reformulating the question and finally the comparison step (FIG. 22).

Since natural language is very rich, it is clear that any given idea can be expressed using words that are very different. To remedy this problem, a reformulation step 216 is used so as to extend the question using equivalent terms.

The purpose of reformulation is to improve the search results when looking for pertinent documents by bringing the concepts expressed in a query closer to those expressed in the base. The action of reformulation is thus intended to reduce silences. To achieve this object, it is necessary to enrich the concepts expressed in the query.

The method adopted consists in using a set of production rules describing semantic methods. Several semantic relationships are provided in order to condition these rules better. There can be rules such as synonyms, associated terms, word families, specific terms, and generic terms. The left-hand portion of a rule contains the word of the query, and the right-hand portion contains reformulated words. Nevertheless, when using this type of reformulation, the concept can be broadened excessively or it can be reformulated using a polysemic term. Under such circumstances, the system will make selections lying outside the desired pertinent documents, covering non-pertinent documents that contain the reformulated words, which shows how important it is to select the terms used in the reformulation rules. The pertinence of the replies depends on several factors, such as, for example, the number of words that have been reformulated from an original word and the size of the documents in the base.

Figure 24:
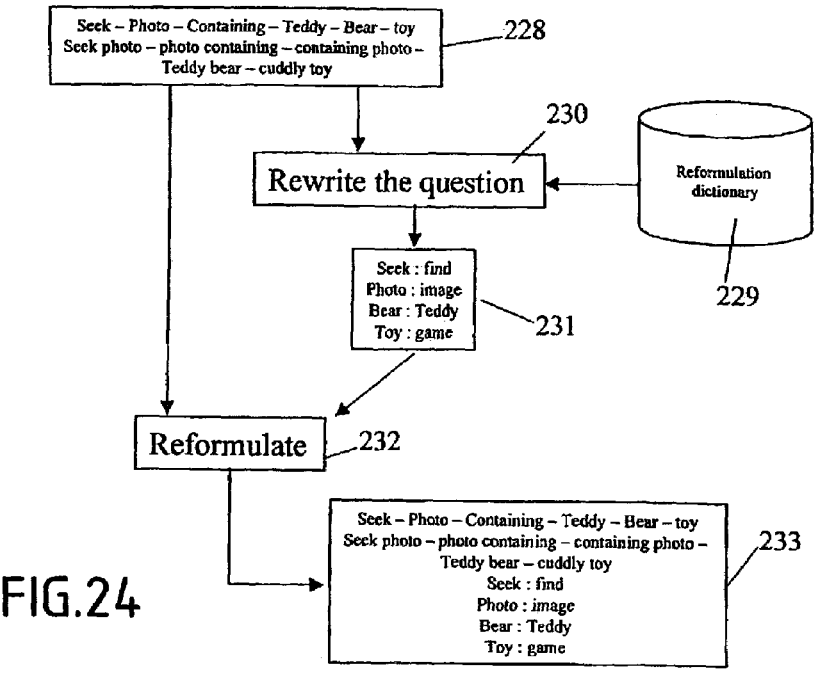
FIG. 24 shows a question reformulation module forming part of the textual search in FIG. 22.

With reference to FIG. 24, there can be seen a list 228 of words or expressions which is initially subjected to a step 230 of rewriting the question in association with a reformulation dictionary 229 having a set of production rules describing semantic relationships.

It should be observed that the word input to a reformulation rule can be a single term or multiple terms. For example, if the input word is "neural network model" the reformulation module produces as an inferred word "connectionist model".

The list 231 of semantic relationships obtained during the step of rewriting the question is used in step 232 for reformulation proper in association with the initial list 228 so as to output a list 233 that reproduces the initial list 228 of words or expressions, enriched by the list 231 of semantic relationships.

The comparator 217 uses all of the information that results from the linguistic analysis.

The first operation consists in reproducing all of the simple words in syntactic dependency and in making up compound words. This operation is used for searching for the words of the question in syntactic dependency as stored in the inverse list of the textual database. The system gives semantic weight to words in syntactic dependency in the question as it does to single words. This semantic weight is greater than or equal to the semantic weights of the single words in the base. This step is similar to that explained with reference to the comparator 172 of FIG. 15.

Thereafter there is a step of computing the weights of simple and compound groups, and then of sorting them as a function of their semantic weights. The following step applies to a group and consists in searching for documents containing these elements. The result of this processing is a descriptor of document overlap. The descriptor of document overlap gives the meaningful words of the question which are present in the document. The size of the overlap corresponds to the number of simple and compound groups that come from the query.

Once the list of pertinent documents has been drawn up, there comes the step of recognizing documents having an identical overlap descriptor. Documents which have the same overlap descriptor are considered as being in the same class of documents. The weight attributed to a class is the sum of the weights of the simple and compound groups characteristics of the class of documents and contributing to forming the overlap description of the documents. Thus, the beginning of the list shows the most pertinent class (having the largest total of class weights).

Weights are given in the system on the basis of the following principle: the more frequently words are to be found in numerous documents, the lower the information weight of those words.

The information entropy of a group is computed when computing the semantic weights. A compound group is of semantic weight that is greater than or equal to that of a single word. In the event of syntactical ambiguity, the system aligns the semantic weight of the group of words having the lowest semantic weight in order to avoid giving a heavy weight to a word coming from wrong analysis.

The most important characteristic of the system is the fact that it prefers to send the responses that are closest rather than sending no response at all (silence). The system can return documents which might be considered as noise when mixed in with documents that are pertinent. The user can navigate freely through the run of reply documents provided by the system. The user can also select an order other than that proposed by the system and can navigate through the selected documents. This gives the user a great deal of freedom, unlike a more sharp-edged approach in which the system decides whether or not a document is pertinent.

The responses are ordered in such a manner that the user can select those classes which match the query. The classes displayed in this way belong to a system using key words with Boolean operators.

The response images are then displayed by order of pertinence. The user evaluates the responses provided as a function of expectations. Thereafter, using a set of keys, the user inputs selections so that the system can get to know the user and improve its responses as a function of a user profile.

Figure 25:
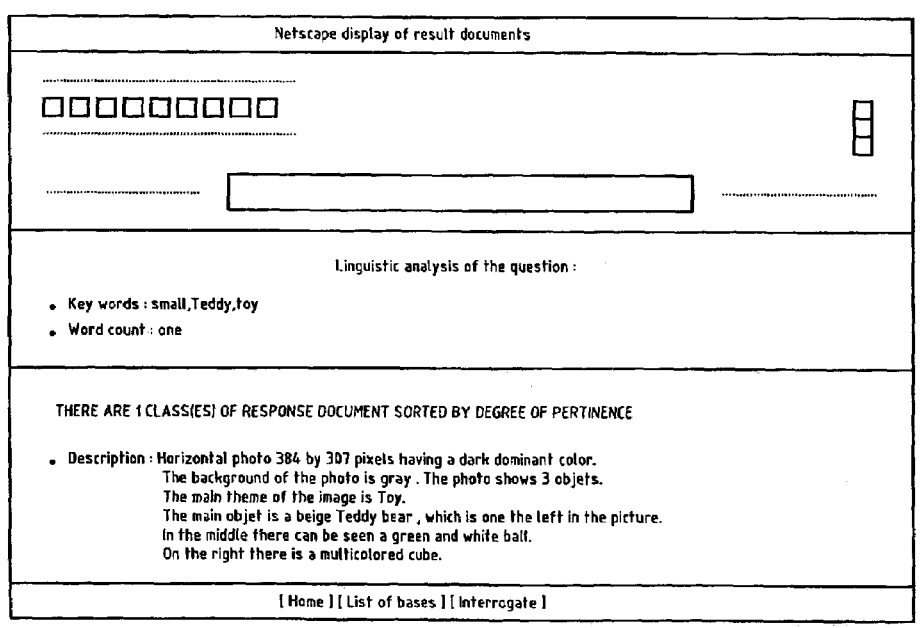
FIG. 25 shows an example of a results screen of a textual search.

FIG. 25 shows an example of a screen displaying a textual search in responsive to the natural language question "a little teddy bear" that has led to the demonstration image of FIG. 1 being cited since it is contained in indexed manner in the image base 13.

The system can naturally enable more detailed results to obtained on the screen, for example also including a reproduction of the image or images found.

Starting from the image database 13 that can be interrogated using the semantics created by the method of the invention, in which the images inserted into the image base 13 have been analyzed, automatically subdivided into elementary components, and then archived, it is possible during a search being made by a user for queries to combine textual aspects and/or graphical aspects, with interrogation being performed in both cases by content. For images, the idea is to find images satisfying certain criterion concerning textures, colors, or shapes, or containing a fragment as specified by the operator. For text, the search can seek to find image descriptions having criteria of semantic similarity with the query.

Queries are processed interactively, and response time is short.

The results of a search for an image by means of the system are presented in the form of a list ordered in application of a criterion integrating the various proximity computations that are implemented.

In the above description, it should be considered that the term "image" applies to an element forming part of an image in the broad sense, and does not correspond exclusively to a physical object, but could also have symbolic meaning.

The invention claimed is:

1. A method of automatically creating an image database that is capable of being interrogated by its semantic content, the database being created from initial images that are not indexed, the method being characterized in that it comprises the following steps:
a) constructing a first indexed database constituting a thematic information dictionary containing a set of thematic information likely to appear in a set of different images;
b) constructing a second indexed database constituting a vade-mecum bringing together a set of textual descriptions of ordinary elementary objects in the form of thumbnail images that are indexed both textually and pictorially;
c) analyzing each initial image overall to identify and list various zones in the image coarsely;
d) comparing each initial image as subjected to overall analysis with images that have previously been indexed in the image database to be built up;

e) classifying an initial image that has been analyzed overall in the image database if the result of the comparison with the previously indexed images reveals a degree of similarity that is greater than a predetermined threshold;

f) analyzing each initial image in local manner if the result of the comparison between the initial image as analyzed overall and the previously indexed images reveals a degree of similarity that is below a predetermined threshold;

g) during local analysis of an initial image, proceeding with a plurality of segmentations of said image into uniform components by using a plurality of different criteria or identifying and isolating a plurality of series of objects constituted by segmented thumbnail images associated with geometrical descriptors for boxes covering said objects;

h) after the step which consists in proceeding with a plurality of segmentations, fusing the results of the segmentation methods;

i) using digital values to characterize each of the object thumbnail images that result from fusion after the segmentation and fusion operations and associated with geometrical descriptors for boxes covering the various objects;

j) comparing each of the object thumbnail images that result from the segmentation and fusion operations with the indexed thumbnail images of the indexed second database and providing together with respective pertinence levels a list of textual descriptions of everyday elementary objects matching said object thumbnail images resulting from the segmentation and fusion operations;

k) for each object thumbnail image resulting from the segmentation and fusion operations, characterizing its color in textual manner by matching the histogram of each object converted into a color space with terms from a chromatic dictionary;

l) for each object thumbnail image resulting from the segmentation and fusion operations, textually characterizing its texture by matching the characteristic vector of the object with those of a dictionary of indexed textures;

m) determining the geometrical aspects of the objects relative to one another, and characterizing in textual manner the spatial relationship and/or the shapes of the various objects; and n) after analyzing the various components of the initial image via said object thumbnail images that result from the segmentation and fusion operations associated with textual descriptions of everyday elementary objects, putting said data into the image base that is to be made up.

2. A method according to claim 1, characterized in that after step m) of determining the geometrical locations of the objects relative to one another and of textually characterizing the spatial relationships between the various objects, performing a step o) of establishing whether an initial image belongs to a theme on the basis of dependency relationships between the various objects and a comparison with the thematic information dictionary.

3. A method according to claim 1, characterized in that after step m) of determining the geometrical locations of the objects relative to one another and of textually characterizing the spatial relationships of the various objects, performing a step p) in which the textual information for an entire indexed image is brought together in association with the vade-mecum.

4. A method according to claim 1, characterized in that during step e) of classification in the image database, special features of the initial image under analysis are characterized relative to each of the most similar previously-indexed images.

5. A method according to claim 1, characterized in that step h) of fusing the results of the representation methods consists in ordering the set of objects that results from the segmentation in order of decreasing area so as to obtain a list, and then so long as there remain unvisited objects in the list, in taking the first free element of the list, in checking to see whether said elements overlap any of the following elements in the list that are free, and if there is an overlap between objects derived from different segmentation methods, in constructing a first graph and in marking said elements as being not free, so as to obtain a series of first graphs, in performing the same operations again using the same objects that result from segmentations ordered in order of increasing area, so as to obtain a series of second graphs, and in combining the first and second graphs so as to fuse the results of the segmentation methods.

6. A method according to claim 1, characterized in that during step g) of segmenting locally analyzed images into uniform components, by using a plurality of different criteria, the following are performed:
  (i) texture characteristics are detected by filtering equivalent to a bank of highpass and lowpass filters;
  (ii) chromatic and achromatic detection are performed; and
  (iii) outlines are detected.

7. A method according to claim 6, characterized in that during segmentation step g), the detection of texture characteristics via filtering equivalent to a bank of highpass filters and lowpass filters comprises a wavelet transformation process performed firstly on rows and then on columns of the image with on each occasion a lowpass filter characterized by the formula:

$$y(i)=0.5*x(i)+0.5y(i-1)$$

and a highpass filter characterized by the formula:

$$y(i)=0.5*x(i)-0.5y(i-1)$$

each element (i,j) of the 3D attribute matrix that results from the splitting being a vector characterizing the distribution of pixel values in the vicinity of the point (i,j).

8. A method according to claim 7, characterized in that after each operation of filtering by means of a highpass filter and a lowpass filter, the number of images obtained is divided by $2^n$ so as to reduce the amount of data to be processed, the integer n increasing with increasing resolution and size of the image to be processed.

9. A method according to claim 6, characterized in that the wavelet transformation process is reiterated several times over n stages, and in that after a smoothing stage, the size of the resulting 3D attribute matrix is reduced in depth by retaining only the [2n+(n−1)] images that contain the most detail.

10. A method according to claim 7, characterized in that a process is also performed of seeking the distribution of the attribute matrix that is best in the sense of maximizing energy.

11. A method according to claim 6, characterized in that during segmentation step g), chromatic and achromatic detection comprises a step of converting the image to the hue saturation value (HSV) model, an achromatic propagation step to eliminate the background, an opening step performed during a first iteration to eliminate noise and reconnect regions, and in the event of non-convergence at the end of this first iteration, a closure step performed during a second iteration.

12. A method according to claim 6, characterized in that during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

13. A method according to claim 7, characterized in that during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

14. A method according to claim 8, characterized in that during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

15. A method according to claim 9, characterized in that during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

16. A method according to claim 10, characterized in that during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

17. A method according to claim 11, characterized in that during segmentation step g), the detection of outlines using an optimum filter comprises a step of converting the image to red-green-blue (RGB) in a single luminance plane, a step of averaging in order to eliminate noise associated with acquisition, a step of computing horizontal and vertical gradients, a step of summing the two gradient images in order to obtain a single image, a step of computing the minimum and the maximum of the resulting image in order to determine high and low thresholding values, a hysteresis thresholding step relative to said high and low threshold values as previously determined, a step of performing morphological opening, and a step of performing multiple morphological closures.

* * * * *